(12) United States Patent
Lolayekar et al.

(10) Patent No.: US 6,976,134 B1
(45) Date of Patent: Dec. 13, 2005

(54) POOLING AND PROVISIONING STORAGE RESOURCES IN A STORAGE NETWORK

(75) Inventors: Santosh C. Lolayekar, Sunnyvale, CA (US); Yu-Ping Cheng, San Jose, CA (US); Renato E. Maranon, Livermore, CA (US); Sanjay Saxena, Fremont, CA (US)

(73) Assignee: EMC Corporation, Hopkinton, MA (US)

( * ) Notice: Subject to any disclaimer, the term of this patent is extended or adjusted under 35 U.S.C. 154(b) by 557 days.

(21) Appl. No.: 10/050,974

(22) Filed: Jan. 18, 2002

Related U.S. Application Data

(60) Provisional application No. 60/325,704, filed on Sep. 28, 2001.

(51) Int. Cl.[7] .............................................. G06F 12/02
(52) U.S. Cl. ........................ 711/148; 709/214; 710/316; 711/170
(58) Field of Search ............................... 709/214, 215; 710/8, 10, 15, 16, 17, 36, 316; 711/114, 148, 711/170, 171, 172

(56) References Cited

U.S. PATENT DOCUMENTS

| | | |
|---|---|---|
| 5,365,526 A | 11/1994 | Wu |
| 5,436,886 A | 7/1995 | McGill |
| 5,596,569 A | 1/1997 | Madonna et al. |
| 5,898,841 A | 4/1999 | Higgins |
| 5,941,972 A | 8/1999 | Hoese et al. |
| 5,954,799 A | 9/1999 | Goheen et al. |
| 6,023,733 A | 2/2000 | Periasamy et al. |
| 6,057,863 A | 5/2000 | Olarig ........................ 345/520 |
| 6,067,545 A | 5/2000 | Wolff .......................... 707/10 |
| 6,092,178 A | 7/2000 | Jindal et al. |
| 6,101,508 A | 8/2000 | Wolff .......................... 707/218 |
| 6,115,752 A | 9/2000 | Chauhan |
| 6,148,414 A | 11/2000 | Brown et al. ................... 714/9 |
| 6,154,787 A | 11/2000 | Urevig et al. |
| 6,157,963 A | 12/2000 | Courtright, II et al. |
| 6,185,601 B1 | 2/2001 | Wolff .......................... 709/203 |
| 6,195,703 B1 | 2/2001 | Blumenau et al. |
| 6,199,112 B1 | 3/2001 | Wilson ........................ 709/227 |
| 6,199,146 B1 | 3/2001 | Pence .......................... 711/154 |
| 6,201,810 B1 | 3/2001 | Masuda et al. |
| 6,209,023 B1 | 3/2001 | Dimitroff ..................... 709/211 |
| 6,212,606 B1 | 4/2001 | Dimitroff ..................... 711/147 |
| D442,585 S | 5/2001 | Toussi et al. ............... D14/356 |

(Continued)

FOREIGN PATENT DOCUMENTS

JP      2000339098      12/2000

(Continued)

OTHER PUBLICATIONS

Julian Satran, draft-ietf-ips-iSCSI-07.txt, Jul. 20, 2001, 160 pages.

(Continued)

*Primary Examiner*—Gary Portka
(74) *Attorney, Agent, or Firm*—Vierra Magen Marcus Harmon & DeNiro LLP

(57) ABSTRACT

A system in accordance with an embodiment of the invention provides Quality of Service (QoS) for Storage Access. Such QoS is partially enabled in one embodiment by the automatic pooling of storage devices and provisioning virtual targets from those pools. QoS is enforced in one embodiment by keeping the bandwidth for each connection within a specified range, and particularly, by controlling the number of allowed concurrent requests from an initiator. Load balancing is also provided in one embodiment, improving response times for requests, further easing the ability to provide QoS.

2 Claims, 14 Drawing Sheets

U.S. PATENT DOCUMENTS

| | | | |
|---|---|---|---|
| 6,247,099 B1 | 6/2001 | Skazinski et al. | 711/141 |
| 6,253,240 B1 * | 6/2001 | Axberg et al. | 709/223 |
| 6,260,120 B1 | 7/2001 | Blumenau | 711/152 |
| 6,272,534 B1 | 8/2001 | Guha | 709/216 |
| 6,304,578 B1 | 10/2001 | Fluss | |
| 6,389,432 B1 | 5/2002 | Pothapragada et al. | |
| 6,400,730 B1 | 6/2002 | Latif et al. | |
| 6,421,723 B1 | 7/2002 | Tawil | |
| 6,434,656 B1 | 8/2002 | Downer et al. | |
| 6,438,595 B1 | 8/2002 | Blumenau et al. | |
| 6,446,141 B1 * | 9/2002 | Nolan et al. | 710/8 |
| 6,470,013 B1 | 10/2002 | Barach et al. | |
| 6,493,750 B1 | 12/2002 | Mathew et al. | |
| 6,496,914 B1 * | 12/2002 | Vook et al. | 711/170 |
| 6,725,393 B1 * | 4/2004 | Pellegrino et al. | 714/6 |
| 6,745,207 B2 * | 6/2004 | Reuter et al. | 707/200 |
| 2001/0020254 A1 | 9/2001 | Blumenau et al. | 709/229 |
| 2001/0034812 A1 | 10/2001 | Ignatius et al. | 711/112 |
| 2001/0037371 A1 | 11/2001 | Ohran | 709/214 |
| 2002/0004883 A1 | 1/2002 | Nguyen et al. | |
| 2002/0057684 A1 * | 5/2002 | Miyamoto et al. | 370/386 |
| 2002/0080786 A1 | 6/2002 | Roberts | |
| 2002/0099797 A1 | 7/2002 | Merrell et al. | |
| 2002/0099914 A1 | 7/2002 | Matsunami et al. | |
| 2002/0103889 A1 | 8/2002 | Markson et al. | |
| 2002/0133539 A1 | 9/2002 | Monday | |
| 2002/0156987 A1 | 10/2002 | Gajjar et al. | |

FOREIGN PATENT DOCUMENTS

| | | |
|---|---|---|
| JP | 2001014147 | 1/2001 |
| WO | WO 99/56433 | 11/1999 |

OTHER PUBLICATIONS

American National Standard, Information Systems—dpANS Fibre Channel Protocol for SCSI, Rev. 012, Robert Snively, Dec. 4, 1995, 75 pages.

Julian Satran, draft-ietf-ips-iSCSI-09.txt, Nov. 19, 2001, 230 pages.

Molero, X, et al. On the Switch Architecture for Fibre Channel Storage Area Networks, Eighth International Conf. on Parallel and Distributed Systems 2001. Proceedings, Jun. 2001, pp. 484-491.

* cited by examiner

POOLING AND PROVISIONING STORAGE RESOURCES IN A STORAGE NETWORK

CROSS-REFERENCE TO RELATED APPLICATIONS

This application claims priority to Provisional Application Ser. No. 60/325,704, entitled STORAGE SWITCH FOR STORAGE AREA NETWORK, and filed Sep. 28, 2001, and incorporated by reference herein.

This application is also related to the following applications, all filed concurrently herewith and all incorporated herein by reference:

STORAGE SWITCH FOR STORAGE AREA NETWORK, Ser. No. 10/051,321;
PROTOCOL TRANSLATION IN A STORAGE SYSTEM, Ser. No. 10/051,415;
SERVERLESS STORAGE SERVICES, Ser. No. 10/051,164;
PACKET CLASSIFICATION IN A STORAGE SYSTEM, Ser. No. 10/051,093;
VIRTUALIZATION IN A STORAGE SYSTEM, Ser. No. 10/051,396;
ENFORCING QUALITY OF SERVICE IN A STORAGE NETWORK Ser. No. 10/051,339; and
LOAD BALANCING IN A STORAGE NETWORK, Ser. No. 10/051,053.

FIELD OF INVENTION

The invention generally relates to storage area networks.

BACKGROUND

The rapid growth in data intensive applications continues to fuel the demand for raw data storage capacity. As companies rely more and more on e-commerce, online transaction processing, and databases, the amount of information that needs to be managed and stored can be massive. As a result, the ongoing need to add more storage, service more users, and back-up more data has become a daunting task.

To meet this growing demand for data, the concept of the Storage Area Network (SAN) has been gaining popularity. A SAN is defined by the Storage Networking Industry Association (SNIA) as a network whose primary purpose is the transfer of data between computer systems and storage elements and among storage elements. Unlike connecting a storage device directly to a server, e.g., with a SCSI connection, and unlike adding a storage device to a LAN with a traditional interface such as Ethernet (e.g., a NAS system), the SAN forms essentially an independent network that does not tend to have the same bandwidth limitations as its direct-connect SCSI and NAS counterparts and also provides increased configurability and scalability.

More specifically, in a SAN environment, storage devices (e.g., tape drives and RAID arrays) and servers are generally interconnected via various switches and appliances. The connections to the switches and appliances are usually Fibre Channel. This structure generally allows for any server on the SAN to communicate with any storage device and vice versa. It also provides alternative paths from server to storage device. In other words, if a particular server is slow or completely unavailable, another server on the SAN can provide access to the storage device. A SAN also makes it possible to mirror data, making multiple copies available and thus creating more reliability in the availability of data. When more storage is needed, additional storage devices can be added to the SAN without the need to be connected to a specific server; rather, the new devices can simply be added to the storage network and can be accessed from any point.

An example of a SAN is shown in the system 100 illustrated in the functional block diagram of FIG. 1. As shown, there are one or more servers 102. Three servers 102 are shown for exemplary purposes only. Servers 102 are connected through an Ethernet connection to a LAN 106 and/or to a router 108 and then to a WAN 110, such as the Internet. In addition, each server 102 is connected through a Fibre Channel connection to each of a plurality of Fibre Channel switches 112 sometimes referred to as the "fabric" of the SAN. Two switches 112 are shown for exemplary purposes only. Each switch 112 is in turn connected to each of a plurality of SAN appliances 114. Two appliances 114 are shown for exemplary purposes only. Each appliance is also coupled to each of a plurality of storage devices 116, such as tape drives, optical drives, or RAID arrays. In addition, each switch 112 and appliance 114 is coupled to a gateway 118, which in turn is coupled to router 108, which ultimately connects to a Wide Area Network (WAN) 118, such as the Internet. FIG. 1 shows one example of a possible configuration of a SAN 119, which includes switches 112, appliances 114, storage devices 116, and gateways 118. Still other configurations are possible. For instance, one appliance may be connected to fewer than all the switches.

Appliances 114 perform the storage management of the SAN. When the appliance 114 receives data, it stores the data in a memory in the appliance. Then, with a processor (also in the appliance), analyzes and operates on the data in order to forward the data to the correct storage device(s). This store-and-forward process typically slows down data access.

While the appliances do perform some switching, because there may be a large number of servers (many more than three), and because each appliance has few ports (usually only two or four), switches 112 are needed to connect the many servers to the few appliances. Nevertheless, switches 112 have little built-in intelligence and merely forward data to a selected appliance 114. One limitation of appliances is the fact that many appliances often have a limited or set number of ports. Adding ports to an appliance, although possible, is typically very expensive. Every one or two ports are supported by an expensive CPU or server card. So generally to add ports, entire file cards (which perform virtualization and store-and-forward functions) must be added to the device, which is usually very costly. In the alternative, appliances are simply added to the SAN, but again, this tends to be very costly.

In addition, SANs, usually in the appliances 114, generally perform a function known as "virtualization." Virtualization occurs when space on one or more physical storage devices is allocated to a particular user, but the physical location of that space remains unknown to the user. For instance, a user may access its company's "engineering storage space," ENG:, accessing and "seeing" the virtual space ENG: as he or she would access or "see" an attached disk drive. Nonetheless, the ENG: space maybe divided over several physical storage devices or even fragmented on a single storage device. Thus, when a server requests a virtual device (e.g., ENG:) and block number, the appliance must determine the device(s) that physically correlate to the virtual device requested and direct the data accordingly.

Although SANs were introduced several years ago, interoperability problems, lack of available skills, and high implementation costs remain major obstacles to widespread use. For instance, SANs as they currently exist have high deployment costs and high management costs. Referring again to FIG. 1, each switch, appliance, and gateway typically come from different vendors, creating a lack of management standards that has resulted in the proliferation of vendor-specific management tools. As a result, to deploy a SAN, equipment must be purchased from multiple vendors. And, as shown in FIG. 1, each switch, appliance, gateway, storage device, server, and router will have its own management, shown as management stations 120. Although independent physical management stations are shown, it is to be understood that independent management is frequently in the form of independent, vendor-specific software on a single computer but which software does not communicate with one another. As a result, there is no centralized management of the SAN and its management costs are high given that there are usually multiple management stations that frequently require many people to manage.

In addition, "provisioning" of (or "creating") virtual targets for SANs has become burdensome. When a new virtual target needs to be created, a human administrator must first determine the application requirements for the data, such as performance, capacity required initially plus that required for potential growth, data availability, and data protection. More specifically, the administrator must allocate all or part of one or more physical devices to the virtual target and configure those devices to produce the best performance as well as access control for data security. The administrator must further assure the routes through the storage network have the level of availability required and may have to install alternate pathing if high availability is required so that if one path goes down another path to the target is available. Finally, the administrator must test the environment to verify the functionality before making the virtual target accessible. Overall, it may take several days or even weeks to create such a virtual target—a time period that is often unacceptable to users of the SAN.

SUMMARY

A system in accordance with an embodiment of the invention automatically discovers storage resources in communication with a switch and obtains information about the characteristics of those resources. Once the characteristics are known, in one embodiment, the device is classified according to a predefined policy and then placed in a storage pool.

From the pool a virtual target can be provisioned. In one embodiment the virtual target is placed in a user domain. An initiator connection is also provisioned in one embodiment. The virtual target, the initiator connection, and the user domain all serve in one embodiment to define a Quality of Service (QoS) policy.

A system in accordance with another embodiment of the invention can further enforce Quality of Service for connections between initiators and targets. Quality of Service, in one embodiment, is enforced by controlling the number of concurrent requests that can be sent from an initiator to a target.

A system in accordance with still another embodiment of the invention can dynamically provide load balancing. In one embodiment, load balancing is performed by sending requests on one of a plurality of alternate paths to a target where the path selected has the shortest average response time. In another embodiment, load balancing occurs in mirrored targets where a request is sent to the member of the mirrored target with the shortest average response time.

BRIEF DESCRIPTION OF THE DRAWINGS

The present invention is described with respect to particular exemplary embodiments thereof and reference is accordingly made to the drawings in which.

DETAILED DESCRIPTION

Figure 2:
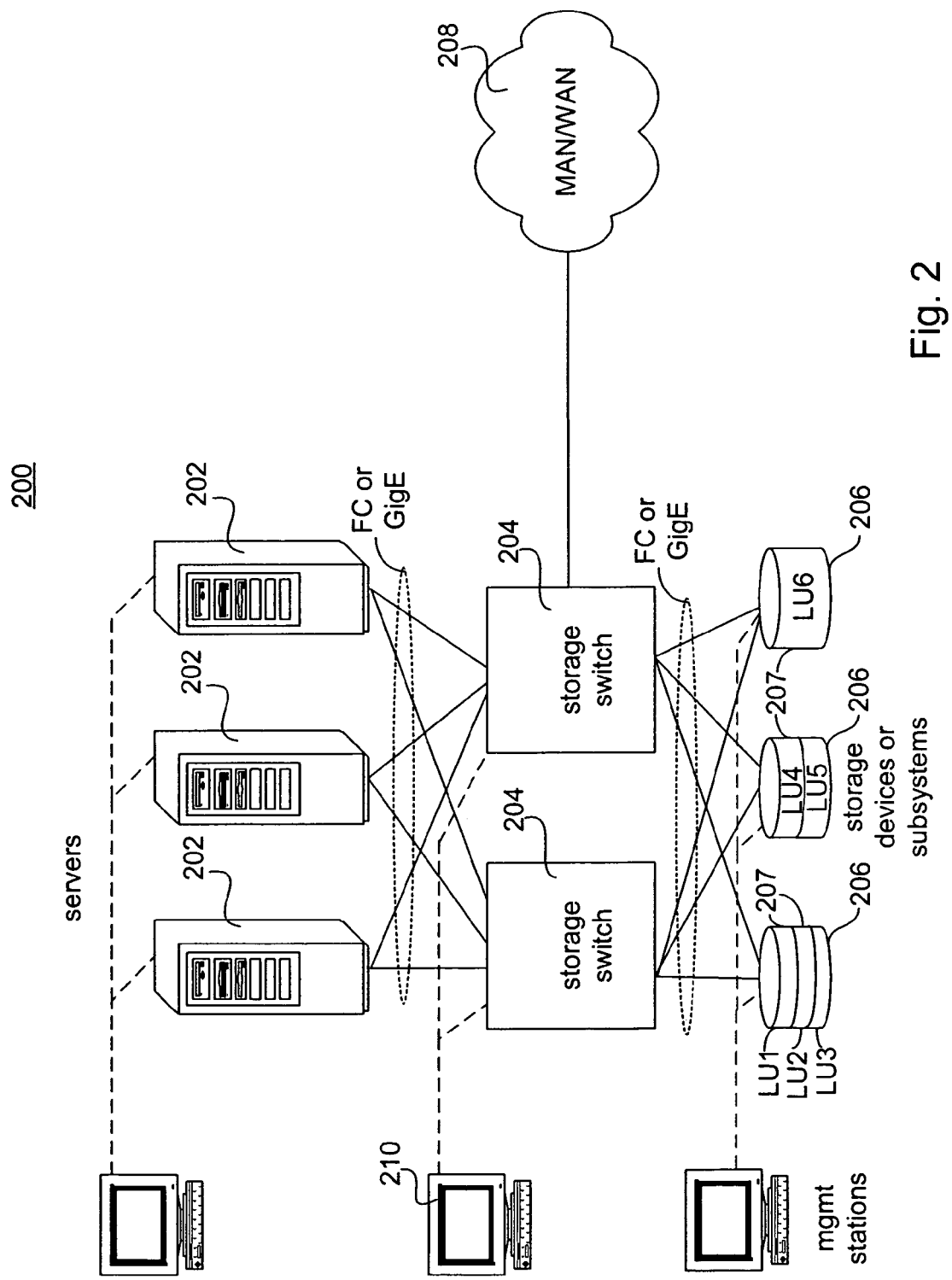
FIG. 2 is a generalized function block diagram of a SAN system using a storage switch in accordance with an embodiment of the invention.

A system 200 that includes a storage switch in accordance with the invention is illustrated in FIG. 2. As shown, such a system is greatly simplified over existing systems. In one embodiment, system 200 includes a plurality of servers 202. For purposes of illustration only, three servers 202 are shown, although more or fewer servers could be used in other embodiments. Although not shown, the servers could also be coupled to a LAN. As shown, each server 202 is connected to a storage switch 204. In other embodiments, however, each server 202 may be connected to fewer than all of the storage switches 204 present. The connections formed between the servers and switches can utilize any protocol, although in one embodiment the connections are either Fibre Channel or Gigabit Ethernet (carrying packets in accordance with the iSCSI protocol). Other embodiments may use the Infiniband protocol, defined by Intel Inc., or other protocols or connections.

In the embodiment illustrated, each switch 204 is in turn connected to each of a plurality of storage devices or subsystems 206. Nonetheless, in other embodiments, each switch 204 may be connected to fewer than all of the storage devices or subsystems 206. The connections formed between the storage switches 204 and storage devices 206 can utilize any protocol, although in one embodiment the connections are either Fibre Channel or Gigabit Ethernet.

In some embodiments, one or more switches 204 are each coupled to a Metropolitan Area Network (MAN) or Wide Area Network (WAN) 208, such as the Internet. The connection formed between a storage switch 204 and a WAN 208 will generally use the Internet Protocol (IP) in most embodiments. Although shown as directly connected to MAN/WAN 208, other embodiments may utilize a router (not shown) as an intermediary between switch 204 and MAN/WAN 208.

In addition, respective management stations 210 are connected to each storage switch 204, to each server 202, and to each storage device 206. Although management stations are illustrated as distinct computers, it is to be understood that the software to manage each type of device could collectively be on a single computer.

Figure 3:
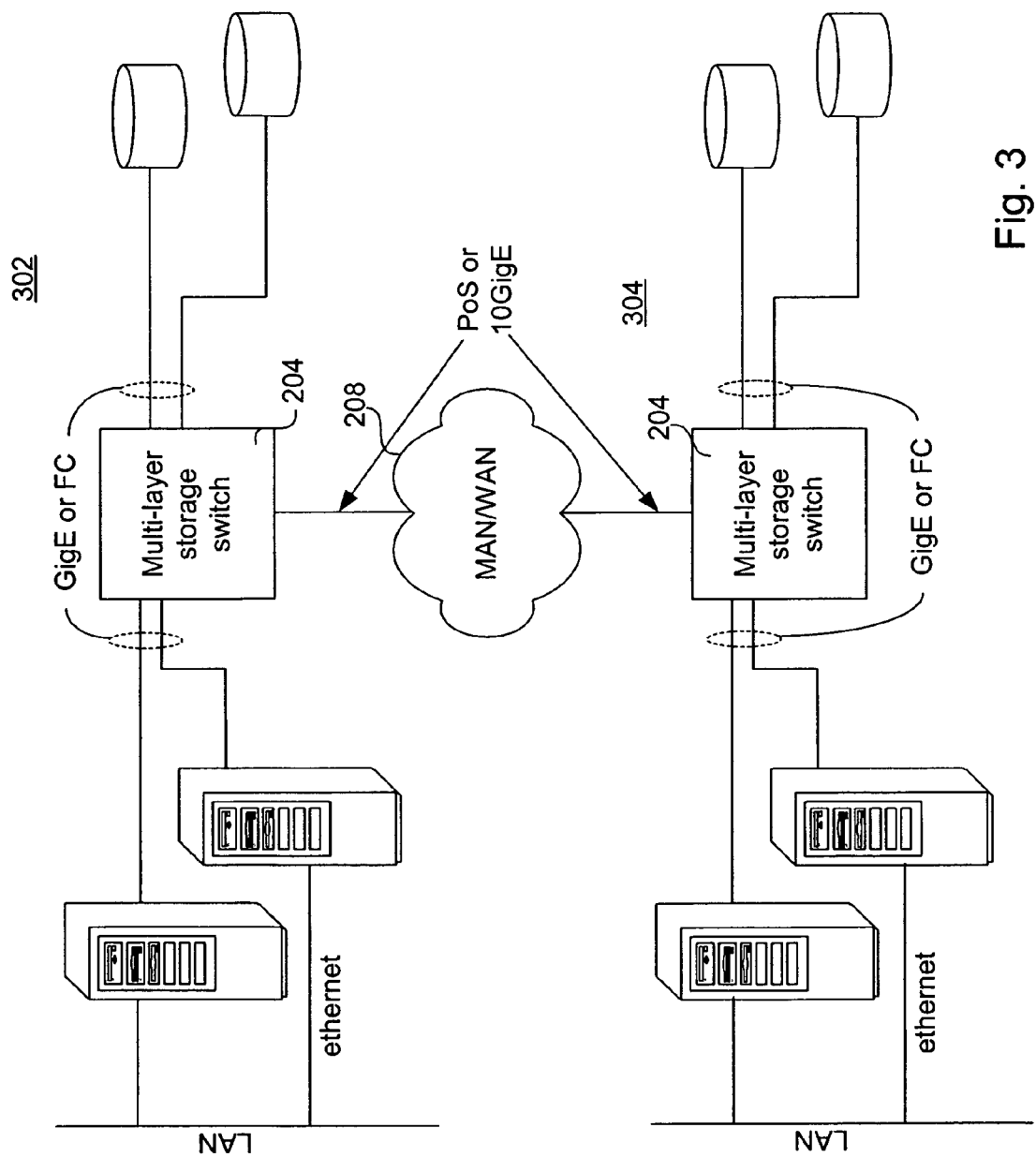
FIG. 3 is a generalized function block diagram of another embodiment of a system using a storage switch in accordance with an embodiment of the invention.

FIG. 3 shows an alternative embodiment of a system in accordance with the invention. In such an embodiment, two SANs 302, 304 are formed, each using one or more storage switches 204 in accordance with an embodiment of the invention. The SANs 302 and 304 are coupled through a WAN 208, such as the Internet, by way of switches 204. Connections 208 can be any standard or protocol, but in one embodiment will be Packet over SONET (PoS) or 10 Gigabit Ethernet.

Figure 4:
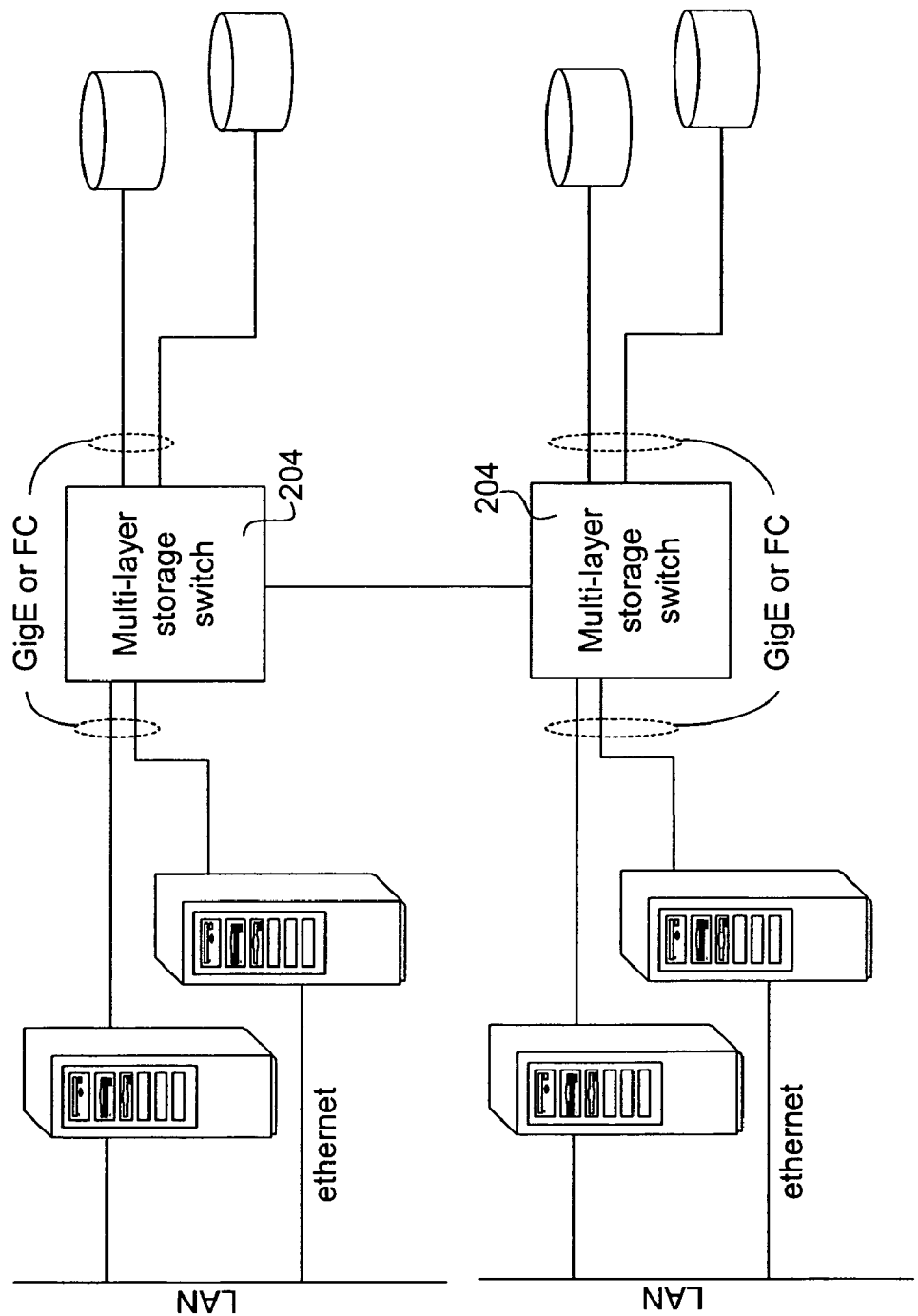
FIG. 4 is a generalized function block diagram of yet another embodiment of a system using a storage switch in accordance with an embodiment of the invention.

FIG. 4 shows still another embodiment of a system in accordance with the invention wherein switches 204 are coupled directly to one another. In any of the embodiments shown in FIG. 2 or 3, if more than one switch is used, those switches could be coupled as illustrated in FIG. 4.

A storage switch in accordance with the invention enables a centralized management of globally distributed storage devices, which can be used as shared storage pools, instead of having a huge number of management stations distributed globally and an army of skilled management personnel. Such a storage switch is an "intelligent" switch, and, as can be seen by comparing FIG. 2 to FIG. 1, the functions of switch, appliance, and gateway have effectively been united in a storage switch 204 in accordance with an embodiment of the invention. Such a storage switch 204, in addition to its switching function, provides the virtualization and storage services (e.g., mirroring) that would typically be provided by appliances in conventional architectures, and it also provides protocol translation. A storage switch in accordance with some embodiments of the invention also performs additional functions (for instance, data security through a Virtual Private Network). Such additional functions include functions that are performed by other devices in conventional systems, such as load balancing, which is traditionally performed by the servers, as well as other functions not previously available in conventional systems, such as Quality of Service for storage access. Moreover, in one embodiment the Quality of Service for storage access function is "application aware"—that is, the Quality of Service provided is specified by the nature of the application initiating a connection to a storage target.

In addition, the intelligence of a storage switch in accordance with an embodiment of the invention is distributed to every switch port. This distributed intelligence allows for system scalability and availability.

Figure 1:
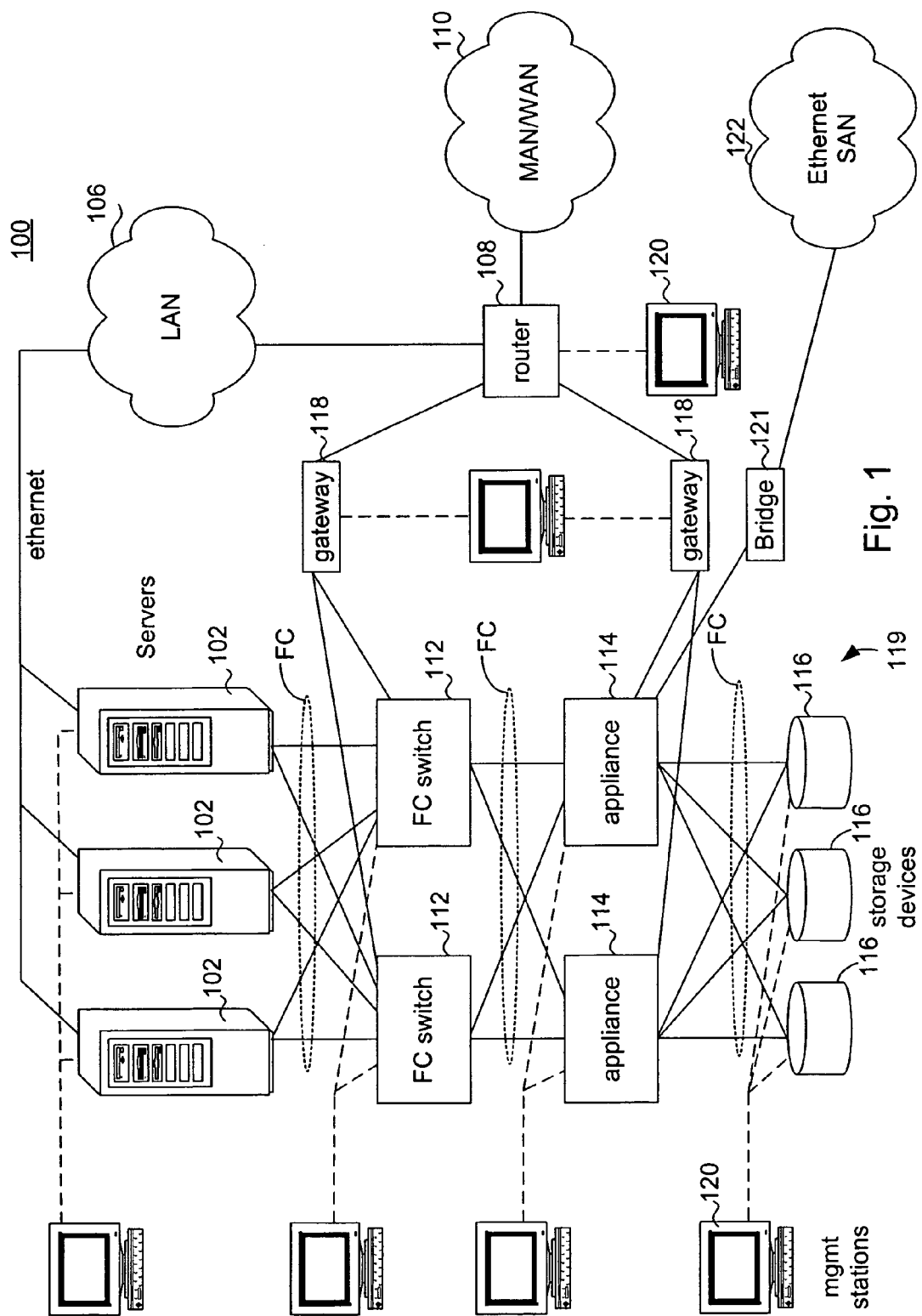
FIG. 1 is a generalized function block diagram of a SAN in accordance with a conventional system.

Further, the distributed intelligence allows a switch in accordance with an embodiment of the invention to process data at "wire speed," meaning that a storage switch 204 introduces no more latency to a data packet than would be introduced by a typical network switch (such as switch 112 in FIG. 1). Thus, "wire speed" for the switch is measured by the connection to the particular port. Accordingly, in one embodiment having OC-48 connections, the storage switch can keep up with an OC-48 speed (2.5 bits per ns). A two Kilobyte packet (with 10 bits per byte) moving at OC-48 speed takes as little as eight microseconds coming into the switch. A one Kilobyte packet takes as little as four microseconds. A minimum packet of 100 bytes only elapses merely 400 ns. Nonetheless, when the term "wire-speed" processing is used herein, it does not mean that such processing needs as few as 400 ns to process a 100-byte packet. However, it does mean that the storage switch can handle the maximum Ethernet packet of 1500 bytes (with ten-bit encoding, so that a byte is ten bits) at OC-48 speed, i.e., in about 6 $\mu$s (4 $\mu$s per Kilobyte or 2.5 bits per ns), in one embodiment. In embodiments with a 1 Gb Ethernet port, where processing is generally defined as one bit per nanosecond, "wire-speed" data for that port will be 10 $\mu$s per Kilobyte, indicating that the switch has up to 10 $\mu$s to process a Kilobyte. In embodiments with a 2 Gb Fibre Channel port, "wire speed" will be 5 $\mu$s per Kilobyte. Still other embodiments may process data at ten Gigabit Ethernet or OC-192 speeds or faster.

As used herein, "virtualization" essentially means the mapping of a virtual target space subscribed to by a user to a space on one or more physical storage target devices. The terms "virtual" and "virtual target" come from the fact that storage space allocated per subscription can be anywhere on one or more physical storage target devices connecting to a storage switch 204. The physical space can be provisioned as a "virtual target" which may include one or more "logical units" (LUs). Each virtual target consists of one or more LUs identified with one or more LU numbers (LUNs), which are frequently used in the iSCSI and FC protocols. Each logical unit is generally comprised of one or more extents—a contiguous slice of storage space on a physical device. Thus, a virtual target may occupy a whole storage device (one extent), a part of a single storage device (one or more extents), or parts of multiple storage devices (multiple extents). The physical devices, the LUs, the number of extents, and their exact locations are immaterial and invisible to a subscriber user.

While the storage space may come from a number of different physical devices, each virtual target belongs to one or more "pools," sometimes referred to herein as "domains." Only users of the same domain are allowed to share the virtual targets in their domain. Domain-sets can also be formed that include several domains as members. Use of domain-sets can ease the management of users of multiple domains, e.g., if one company has five domains but elects to discontinue service, only one action need be taken to disable the domain-set as a whole. The members of a domain-set can be members of other domains as well.

Figure 5:
FIG. 5 is a generalized function block diagram of a storage switch in accordance with an embodiment of the invention.

FIG. 5 illustrates a function block diagram of a storage switch 204 in accordance with an embodiment of the invention. In one embodiment, the storage switch 204 includes a plurality of linecards 502, 504, and 506, a plurality of fabric cards 508, and two system control cards 510, each of which will be described in further detail below.

System Control Cards. Each of the two System Control Cards (SCCs) 510 connects to every line card 502, 504, 506. In one embodiment, such connections are formed by I²C signals, which are well known in the art, and through an Ethernet connection with the SCC. The SCC controls power up and monitors individual linecards, as well as the fabric cards, with the I²C connections. Using inter-card communication over the ethernet connections, the SCC also initiates various storage services, e.g., snapshot and replicate, discussed in Provisional Application No. 60/325,704.

In addition the SCC maintains a database 512 that tracks configuration information for the storage switch as well as all virtual targets and physical devices attached to the switch, e.g., servers and storage devices. In addition, the database keeps information regarding usage, error and access data, as well as information regarding different domains and domain sets of virtual targets and users. The records of the database are referred to herein as "objects." Each initiator (e.g., a server) and target (e.g., a storage device) has a World Wide Unique Identifier (WWUI), which are known in the art. The database is maintained in a memory device within the SCC, which in one embodiment is formed from flash memory, although other memory devices will also be satisfactory.

The storage switch 204 can be reached by a management station 210 through the SCC 510 using an ethernet connection. Accordingly, the SCC also includes an additional Ethernet port for connection to a management station. An administrator at the management station can discover the addition or removal of storage devices or virtual targets, as well as query and update virtually any object stored in the SCC database 512.

Of the two SCCs 510, one is the main operating SCC while the other is a backup, remaining synchronized to the actions in the storage switch, but not directly controlling them. The SCCs operate in a high availability mode wherein if one SCC fails, the other becomes the primary controller.

Fabric Cards. In one embodiment of switch 204, there are three fabric cards 508, although other embodiments could have more or fewer fabric cards. Each fabric card 508 is coupled to each of the linecards 502, 504, 506 in one embodiment and serves to connect all of the linecards together. In one embodiment, the fabric cards 508 can each handle maximum traffic when all linecards are populated. Such traffic loads handled by each linecard are up to 160 Gbps in one embodiment although other embodiments could handle higher or lower maximum traffic volumes. If one fabric card 508 fails, the two surviving cards still have enough bandwidth for the maximum possible switch traffic: in one embodiment, each linecard generates 20 Gbps of traffic, 10 Gbps ingress and 10 Gbps egress. However, under normal circumstances, all three fabric cards are active at the same time. From each linecard, the data traffic is sent to any one of the three fabric cards that can accommodate the data.

Linecards. The linecards form connections to servers and to storage devices. In one embodiment, storage switch 204 supports up to sixteen linecards although other embodiments could support a different number. Further, in one embodiment, three different types of linecards are utilized: Gigabit Ethernet (GigE) cards 502, Fibre Channel (FC) cards 504, and WAN cards 506. Other embodiments may include more or fewer types of linecards. The GigE cards 502 are for Ethernet connections, connecting in one embodiment to either iSCSI servers or iSCSI storage devices (or other Ethernet based devices). The FC cards 504 are for Fibre Channel connections, connecting to either Fibre Channel Protocol (FCP) servers or FCP storage devices. The WAN cards 506 are for connecting to a MAN or WAN.

Figure 6:
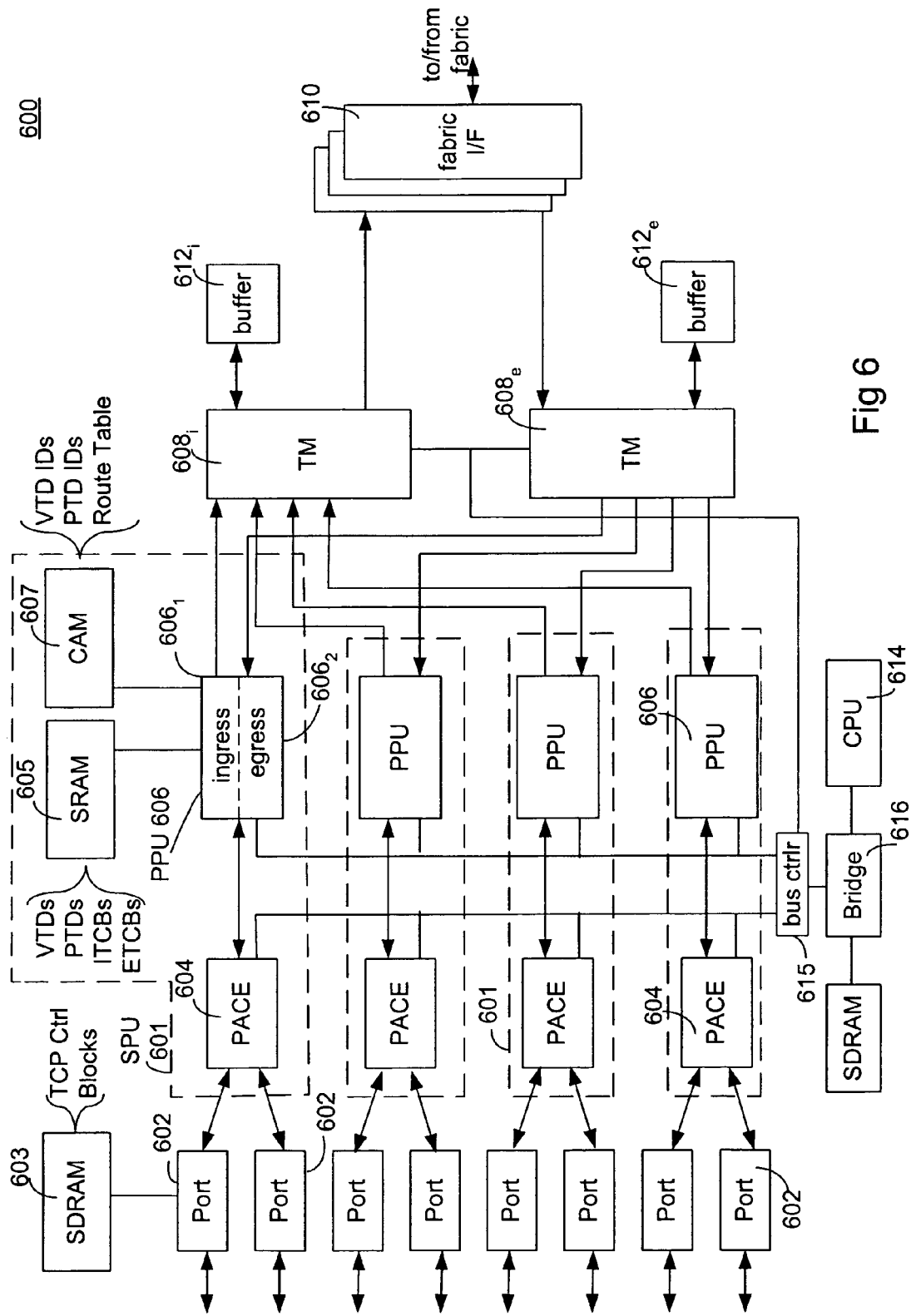
FIG. 6 is a generalized function block diagram of a linecard used in a storage switch in accordance with an embodiment of the invention.

FIG. 6 illustrates a functional block diagram of a generic line card 600 used in one embodiment of a storage switch 204 in accordance with the invention. The illustration shows those components that are common among all types of linecards, e.g., GigE 502, FC 504, or WAN 506. In other embodiments other types of linecards can be utilized to connect to devices using other protocols, such as Infiniband. The differences in the linecards are discussed subsequently.

Ports. Each line card 600 includes a plurality of ports 602. The ports form the linecard's connections to either servers or storage devices. Eight ports are shown in the embodiment illustrated, but more or fewer could be used in other embodiments. For example, in one embodiment each GigE card can support up to eight 1 Gb Ethernet ports, each FC card can support up to either eight 1 Gb FC ports or four 2 Gb FC ports, and each WAN card can support up to four OC-48 ports or two OC-192 ports. Thus, in one embodiment, the maximum possible connections are 128 ports per switch 204. The ports of each linecard are full duplex and connect to either a server or other client, or to a storage device or subsystem.

In addition each port 602 has an associated memory 603. Although only one memory device is shown connected to one port, it is to be understood that each port may have its own memory device or the ports may all be coupled to a single memory device. Only one memory device is shown here coupled to one port for clarity of illustration.

Storage Processor Unit. In one embodiment, each port is associated with a Storage Processor Unit (SPU) 601. In one embodiment the SPU rapidly processes the data traffic allowing for wire-speed operations. In one embodiment, the SPU includes several elements: a Packet Aggregation and Classification Engine (PACE) 604, a Packet Processing Unit (PPU) 606, an SRAM 605, and a CAM 607. Still other embodiments may use more or fewer elements or could combine elements to obtain the same funtionality. For instance, some embodiments may include a PACE and a PPU in the SPU, but the SPU may share memory elements with other SPUs.

PACE. Each port is coupled to a Packet Aggregation and Classification Engine (PACE) 604. As illustrated, the PACE 604 aggregates two ports into a single data channel having twice the bandwidth. For instance, the PACE 604 aggregates two 1 Gb ports into a single 2 Gb data channel. The PACE classifies each received packet into a control packet or a data packet, as described in Provisional Application No. 60/325,704. Control packets are sent to the CPU 614 for processing, via bridge 616. Data packets are sent to a Packet Processing Unit (PPU) 606, discussed below, with a local header added. In one embodiment the local header is sixteen bytes resulting in a data "cell" of 64 bytes (16 bytes of header and 48 bytes of payload). The local header is used to carry information and used internally by switch 204. The local header is removed before the packet leaves the switch. Accordingly, as used herein a "cell" is a transport unit that is used locally in the switch that includes a local header and the original packet (in some embodiments, the original TCP/IP headers are also stripped from the original packet). Nonetheless, not all embodiments of the invention will create a local header or have "internal packets" (cells) that differ from external packets. Accordingly, the term "packet" as used herein can refer to either "internal" or "external" packets.

The classification function helps to enable a switch to perform storage virtualization and protocol translation functions at wire speed without using a store-and-forward model of conventional systems. Each PACE has a dedicated path to a PPU 606 while all four PACEs in the illustrated embodiment share a path to the CPU 614, which in one embodiment is a 104 MHz/32 (3.2 Gbps) bit data path.

Packet Processing Unit (PPU). The PPU 606 performs virtualization and protocol translation on-the-fly, meaning, the cells are not buffered for such processing, as described in Provisional Application No. 60/325,704. It also implements other switch-based storage service functions, described later. The PPU is capable, in one embodiment, of moving cells at OC-48 speed or 2.5 Gbps for both the ingress and egress directions, while in other embodiments it can move cells at OC-192 speeds or 10 Gbps. The PPU in one embodiment includes an ingress PPU $606_1$ and an egress PPU $606_2$, which both run concurrently. The ingress PPU $606_1$ receives incoming data from PACE 604 and sends data to the Traffic Manager $608_i$ while the egress PPU $606_2$ receives data from Traffic Manager $608_e$ and sends data to a PACE 604. Although only one PPU 606 is shown in FIG. 6 as having an ingress PPU $606_1$ and an egress PPU $606_2$, it is to be understood that in one embodiment all PPUs 606 will include both an ingress and an egress PPU and that only one PPU is shown in FIG. 6 with both ingress and egress PPUs for clarity of illustration.

Figure 7B:
FIG. 7b is a generalized block diagram of a Physical Target Descriptor used in a storage switch in accordance with an embodiment of the invention.
Figure 7A:
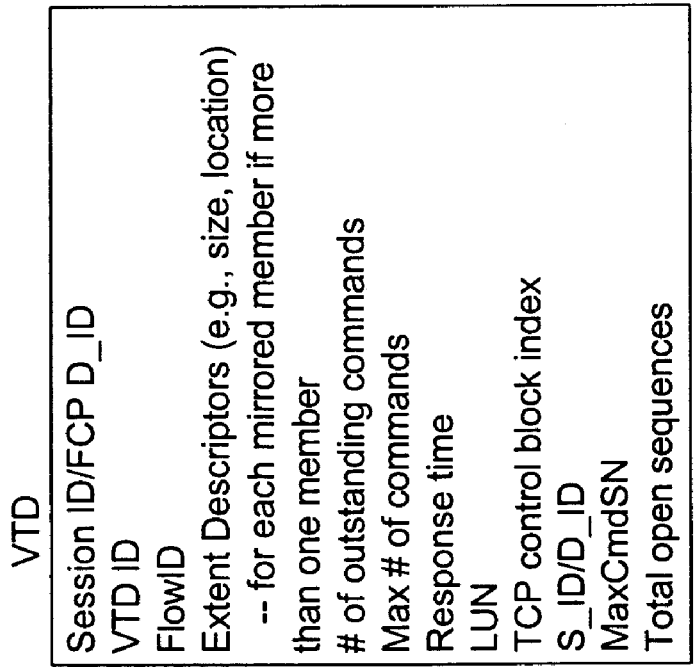
FIG. 7a is a generalized block diagram of a Virtual Target Descriptor used in a storage switch in accordance with an embodiment of the invention.

A large number of storage connections (e.g., server to virtual target) can be established concurrently at each port. Nonetheless, each connection is unique to a virtual target and can be uniquely identified by a TCP Control Block Index (in the case of iSCSI connections) and a port number. When a connection is established, the CPU 614 of the linecard 600 informs the PPU 606 of an active virtual target by sending it a Virtual Target Descriptor (VTD) for the connection. The VTD includes all relevant information regarding the connection and virtual target that the PPU will need to properly operate on the data, e.g., perform virtualization, translation, and various storage services. The VTD is derived from an object in the SCC database and usually contains a subset of information that is stored in the associated object in the SCC database. An example of the fields in a VTD in one embodiment of the invention are shown in FIG. 7a. Nonetheless, other embodiments of the invention may have a VTD with more, fewer, or different fields.

Similarly, Physical Target Descriptors (PTDs) are utilized in an embodiment of the invention. PTDs describe the actual physical devices, their individual LUs, or their individual extents (a contiguous part of or whole LU) and will include information similar to that for the VTD. Also, like the VTD, the PTD is derived from an object in the SCC database. An example of the fields in a PTD in one embodiment of the invention are shown in FIG. 7b. Nonetheless, other embodiments of the invention may have a PTD with more, fewer, or different fields.

To store the VTDs and PTDs and have quick access to them, in one embodiment the PPUs 606 are connected to an SRAM 605 and CAM 607. SRAM 605 stores a VTD and PTD database. A listing of VTD Identifiers (VTD IDs), or addresses, as well as PTD Identifiers (PTD IDs), is also maintained in the PPU CAM 607 for quick accessing of the VTDs. The VTD IDs are indexed (mapped) using a TCP Control Block Index and a LUN. The PTD IDs are indexed using a VTD ID. In addition, for IP routing services, the CAM 607 contains a route table, which is updated by the CPU when routes are added or removed.

Note that although only one CAM and an SRAM are illustrated as connected to one PPU, this is to maintain clarity of the illustration. In various embodiments, each PPU will be connected with its own CAM and SRAM device, or the PPUs will all be connected to a single CAM and/or SRAM.

For each outstanding request to the PPU (e.g., reads or writes), a task control block is established in the PPU SRAM 607 to track the status of the request. There are ingress task control blocks (ITCBs) tracking the status of requests received by the storage switch on the ingress PPU and egress task control blocks (ETCBs) tracking the status of requests sent out by the storage switch on the egress PPU. For each virtual target connection, there can be a large number of concurrent requests, and thus many task control blocks. Task control blocks are allocated as a request begins and freed as the request completes.

Traffic Manager. There are two traffic managers (TMs) 608 on each linecard 600: one TM $608_i$ for ingress traffic and one TM 608, for egress traffic. The ingress TM receives cells from all four SPUs, in the form of 64-byte data cells, in one embodiment. In such an embodiment, each data cell has 16 bytes of local header and 48 bytes of payload. The header contains a FlowID that tells the TM the destination port of the cell. In some embodiments, the SPU may also attach a TM header to the cell prior to forwarding the cell to the TM. Either the TM or the SPU can also subdivide the cell into smaller cells for transmission through the fabric cards in some embodiments.

The ingress TM sends data cells to the fabric cards via a 128-bit 104 Mhz interface 610 in one embodiment. Other embodiments may operate at 125 Mhz or other speeds. The egress TM receives the data cells from the fabric cards and delivers them to the four SPUs.

Both ingress and egress TMs have a large buffer 612 to queue cells for delivery. Both buffers 612 for the ingress and egress TMs are 64 MB, which can queue a large number of packets. The SPUs can normally send cells to the ingress TM quickly as the outgoing flow of the fabric cards is as fast as the incoming flow. Hence, the cells are moving to the egress TM quickly. On the other hand, an egress TM may be backed up because the outgoing port is jammed or being fed by multiple ingress linecards. In such a case, a flag is set in the header of the outgoing cells to inform the egress SPU to take actions quickly. The egress TM also sends a request to the ingress SPU to activate a flow control function, discussed further below, used in providing Quality of Service for Storage access. It is worth noting that, unlike communications traffic over the Internet, for storage traffic dropping a packet or cell is unacceptable. Therefore, as soon as the amount of cells in the buffer exceeds a specified threshold, the SPU must activate its flow control function to slow down the incoming traffic to avoid buffer overflow.

Fabric Connection. The fabric connection 610 converts the 256-bit parallel signals of the TM (128 bits ingress and 128 bits egress, respectively), into a 16-bit serial interface (8-bit ingress and 8-bit egress) to the backplane at 160 Gbps. Thus the backplane is running at one sixteenth of the pins but sixteen times faster in speed. This conversion enables the construction of a high availability backplane at a reasonable cost without thousands of connecting pins and wires. Further, because there are three fabric cards in one embodiment, there are three high-speed connectors on each linecard in one embodiment, wherein the connectors each respectively connect the 8-bit signals to a respective one of the three fabric cards. Of course, other embodiments may not require three fabric connections 610.

CPU. On every linecard there is a processor (CPU) 614, which in one embodiment is a PowerPC 750 Cxe. In one embodiment, CPU 614 connects to each PACE with a 3.2 Gb bus, via a bus controller 615 and a bridge 616. In addition, CPU 614 also connects to each PPU, CAM and TM, however, in some embodiments this connection is slower at 40 Mbps. Both the 3.2 Gb and 40 Mb paths allow the CPU to communicate with most devices in the linecard as well as to read and write the internal registers of every device on the linecard, download microcode, and send and receive control packets.

The CPU on each linecard is responsible to initialize every chip at power up and to download microcode to the SPUs and each port wherever the microcode is needed. Once the linecard is in running state, the CPU processes the control traffic. For information needed to establish a virtual target connection, the CPU requests the information from the SCC, which in turn gets the information from an appropriate object in the SCC database.

Distinction in Linecards-Ports. The ports in each type of linecard, e.g., GigE, FC, or WAN are distinct as each linecard only supports one type of port in one embodiment. Each type of port for one embodiment is described below. Of course other linecard ports could be designed to support other protocols, such as Infiniband in other embodiments.

GigE Port. A gigabit Ethernet port connects to iSCSI servers and storage devices. While the GigE port carries all kinds of Ethernet traffic, the only network traffic generally to be processed by a storage switch 204 at wire speed in accordance with one embodiment of the invention is an iSCSI Packet Data Unit (PDU) inside a TCP/IP packet. Nonetheless, in other embodiments packets in accordance with other protocols (like Network File System (NFS)) carried over Ethernet connections may be received at the GigE Port and processed by the SPU and/or CPU.

The GigE port receives and transmits TCP/IP segments for virtual targets or iSCSI devices. To establish a TCP connection for a virtual target, both the linecard CPU 614 and the SCC 510 are involved. When a TCP packet is received, and after initial handshaking is performed, a TCP control block is created and stored in the GigE port memory 603. A VTD must also be retrieved from an object of the SCC database and stored in the CPU SDRAM 605 for the purpose of authenticating the connection and understanding the configuration of the virtual target. The TCP Control Block identifies a particular TCP session or iSCSI connection to which the packet belongs, and contains in one embodiment, TCP segment numbers, states, window size, and potentially other information about the connection. In addition, the TCP Control Block is identified by an index, referred to herein as the "TCP Control Block Index." A VTD for the connection must be created and stored in the SPU SRAM 605. The CPU creates the VTD by retrieving the VTD information stored in its SDRAM and originally obtained from the SCC database. A VTD ID is established in a list of VTD IDs in the SPU CAM 607 for quick reference to the VTD. The VTD ID is affiliated with and indexed by the TCP Control Block Index.

When the port receives iSCSI PDUs, it serves essentially as a termination point for the connection, but then the switch initiates a new connection with the target. After receiving a packet on the ingress side, the port delivers the iSCSI PDU to the PACE with a TCP Control Block Index, identifying a specific TCP connection. For a non-TCP packet or a TCP packet not containing an iSCSI PDU, the port receives and transmits the packet without acting as a termination point for the connection. Typically, the port 602 communicates with the PACE 604 that an iSCSI packet is received or sent by using a TCP Control Block Index. When the TCP Control Block Index of a packet is −1, it identifies a non-iSCSI packet.

FC Port. An FC port connects to servers and FC storage devices. The FC port appears as a fibre channel storage subsystem (i.e., a target) to the connecting servers, meaning, it presents a large pool of virtual target devices that allow the initiators (e.g., servers) to perform a Process Login (PLOGI or PRLI), as are understood in the art, to establish a connection. The FC port accepts the GID extended link services (ELSs) and returns a list of target devices available for access by that initiator (e.g., server).

When connecting to fibre channel storage devices, the port appears as a fibre channel F-port, meaning, it accepts a Fabric Login, as is known in the art, from the storage devices and provides name service functions by accepting and processing the GID requests—in other words, the port will appear as an initiator to storage devices.

In addition, an FC port can connect to another existing SAN network, appearing in such instances as target with many LUs to the other network.

At the port initialization, the linecard CPU must go through both sending Fabric Logins, Process Logins, and GIDs as well as receive the same. The SCC supports an application to convert FC ELS's to iSNS requests and responses. As a result, the same database in the SCC keeps track both the FC initiators (e.g., servers) and targets (e.g., storage devices) as if they were iSCSI initiators and targets.

When establishing an FC connection, unlike for a GigE port, an FC port does not need to create TCP control blocks or their equivalent; all the necessary information is available from the FC header. But, a VTD (indexed by a D_ID) will still need to be established in a manner similar to that described for the GigE port.

An FC port can be configured for 1 Gb or 2 Gb. As a 1 Gb port, two ports are connected to a single PACE as illustrated in FIG. 6; but in an embodiment where it is configured as a 2 Gb port, port traffic and traffic that can be accommodated by the SPU should match to avoid congestion at the SPU. The port connects to the PACE with a POS/PHY interface in one embodiment. Each port can be configured separately, i.e. one PACE may have two 1 Gb ports and another PACE has a single 2 Gb port.

WAN Ports. In embodiments that include a WAN linecard, the WAN linecard supports OC-48 and OC-192 connections in one embodiment. Accordingly, there are two types of WAN ports: OC-48 and OC-192. For OC-48, there is one port for each SPU. There is no aggregation function in the PACE, although there still is the classification function. A WAN port connects to SONET and works like a GigE port as it transmits and receives network packets such as ICMP, RIP, BPG, IP and TCP. Unlike the GigE port, a WAN port in one embodiment supports network security with VPN and IPSec that requires additional hardware components.

Since OC-192 results in a faster wire speed, a faster SPU will be required in embodiments that support OC-192.

Switch-Based Storage Operations

A storage switch in accordance with an embodiment of the invention performs various switch-based storage operations, including pooling and provisioning, Quality of Service for storage access, and load balancing, each of which will be discussed below.

A general knowledge of the iSCSI and FC protocols is assumed. For more information on iSCSI refer to "draft-ietf-ips-iSCSI-09.txt," an Internet Draft and work in progress by the Internet Engineering Task Force (IETF), Nov. 19, 2001, incorporated by reference herein. For more information about Fibre Channel (FC) refer to "Information Systems—dpANS Fibre Channel Protocol for SCSI," Rev. 012, Dec. 4, 1995 (draft proposed American National Standard), incorporated by reference herein. In addition, both are further described in Provisional Application No. 60/325,704.

Storage Pools

As shown in FIG. 2, in its physical configuration, a system in accordance with an embodiment of the invention includes a switch 204 coupled to one or more servers 202 and to one or more physical devices 206, i.e., storage devices or subsystems. Each physical target is comprised of one or more logical units (LUs) 207. It is from these LUs that virtual targets will ultimately be formed.

However, before a virtual target can be created, or "provisioned," the switch needs to be "aware" of the physical storage devices attached and/or available for access by it as well as the characteristics of those physical storage devices. Accordingly, in one embodiment of the invention, when a storage device or an initiator device is connected to or registered with the switch, the switch must learn about the performance characteristics of the new device. In one embodiment, the switch includes a utility program, which can measure storage access time, data transfer rate, cache support, number of alternate paths to the device, RAID support, and allowable maximum commands for the LUs of the physical device. In some embodiments, once a device is connected to the switch, the utility program will automatically discover the device and automatically gather the required information without any user or other intervention. In some such embodiments, the switch will "discover" the addition/removal of a device when there is a disturbance or reset on the signal lines to the port. Once the device is "discovered," various inquiries are sent to the device to gather information regarding performance characteristics. For instance, read/write commands can be sent to measure transfer rate or to check access time. Alternatively, in some embodiments, the obtaining of performance characteristics can be done by having an administrator enter the performance characteristics at a management station 210, wherein the characteristics can then be provided to a switch 204.

Based on the information gathered about the device, all of which is generally invisible to the end user, in one embodiment of the invention the switch classifies the device based on a policy. For example, devices with the best characteristics may be classified as Platinum devices. Those with intermediate performance characteristics as Gold or Silver devices. Those with the worst performance characteristics as Bronze devices. Of course, the types of policies that are defined are infinite and will vary amongst embodiments of the invention. Moreover, in some embodiments an administrator could further subdivide the policies, e.g., Platinum Building 1, Platinum Building 2, and assign resources to such subdivided policies. Nonetheless, an example of policies used in one embodiment of the invention are shown in Table 1 below:

TABLE 1

| Policy Name | Platinum | Gold | Silver | Bronze |
|---|---|---|---|---|
| PERFORMANCE PARAMETERS | | | | |
| Access time in milliseconds | >7 | >10 | >12 | >15 |
| Transfer rate in Megabytes/Sec | >30 | >20 | >15 | >10 |
| Max cache size in Megabytes | >32 | >16 | >8 | >1 |
| I/O per second rating | >3000 | >2000 | >1000 | >500 |
| Mbytes/second for backup | >8 | >5 | >3 | >1 |
| Mean Time Between Failure (MTBF) in years | >15 | >10 | >8 | >5 |
| RAID Level 0, 1, 2, etc. 0xEE = none | 1 | 5 | None | None |
| Maximum allowable commands | >100 | >50 | >25 | — |

Figure 8:
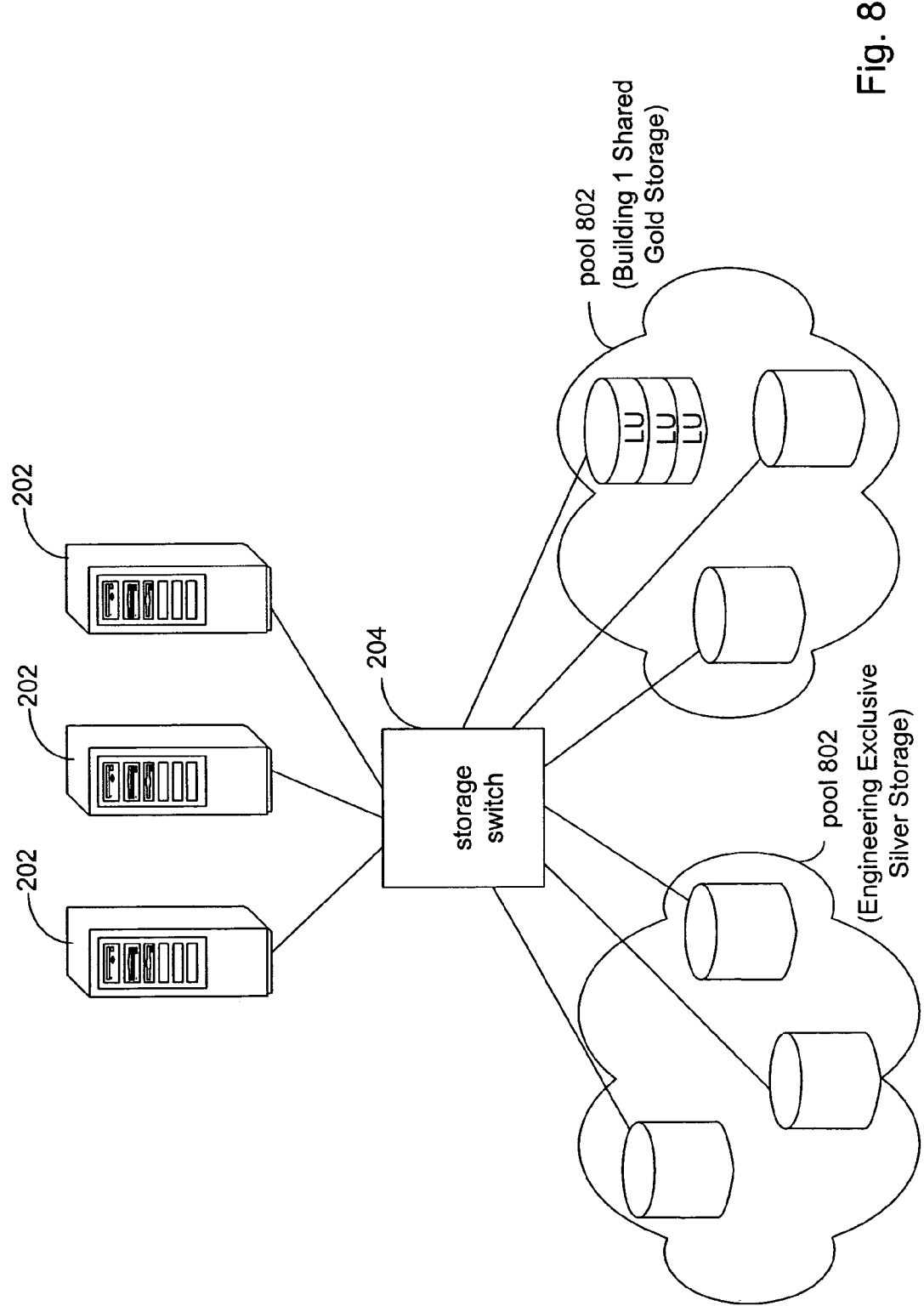
FIG. 8 is a generalized block diagram illustrating storage pools.

As shown in FIG. 8, once a policy has been determined for a storage device, the LUs for the device are assigned to a storage pool 802, sometimes referred to herein as a "domain." Since each storage device is comprised of one or more LUs, all the LUs of a particular storage device are assigned to the same pool. However, in one embodiment, each LU is considered by the switch as a separate storage node and each LU is described by an LU object in the SCC database 512. Thus, each pool has as members the LUs. In one embodiment, assignment to a pool is done independent of the protocol under which the physical storage device operates, e.g., iSCSI or Fiber Channel. As will be understood by those of skill in the art, each pool is defined in a switch by a listing for the pool of the LUs assigned to it, which listing is stored in the SCC database 512 in one embodiment. Such a listing may be comprised of pointers to the LU objects.

Generally each pool will be accessible only to users with particular characteristics. For example, a storage pool may be established for those users located in a Building 1, where the pool is entitled "Building 1 Shared Gold Storage Pool." Another exemplary pool may be entitled "Engineering Exclusive Silver Storage Pool" and may be exclusively accessible by the engineering team at a particular company. Of course an infinite variation of pools could be established and those described and illustrated are exemplary only.

In addition, in an embodiment, there are two special pools: a "Default Pool" and a "No Pool." A Default Pool allows access to anyone with access to the storage network. A "No Pool," in contrast, is not generally accessible to users and is only accessible to the switch itself or to the system administrator. Once assigned to a pool, the LUs can be reassigned to different pools by the switch itself or by a system administrator. For instance, an LU may initially be placed in the No Pool, tested, and then later moved to the default pool or other pool.

Quality of Service and Service Level Agreements

Service Level Agreements (SLAs) are sometimes used in network communications, but have not generally been used in the context of a storage network and have not been used in storage networks with Quality of Service (QoS) policies. By providing SLA/QoS, a user can select the conditions of storing and retrieving data. In one embodiment a QoS policy is defined by three elements: provisioning a virtual target, provisioning an initiator connection, and defining a user domain. Each is discussed below. Nonetheless, some embodiments may not require all three elements to define a QoS policy. For instance, some embodiments may only require provisioning a virtual target and provisioning an initiator connection, but not the user domain. Other embodiments may use different elements altogether to define a QoS policy.

Provisioning a Virtual Target

Figure 9:
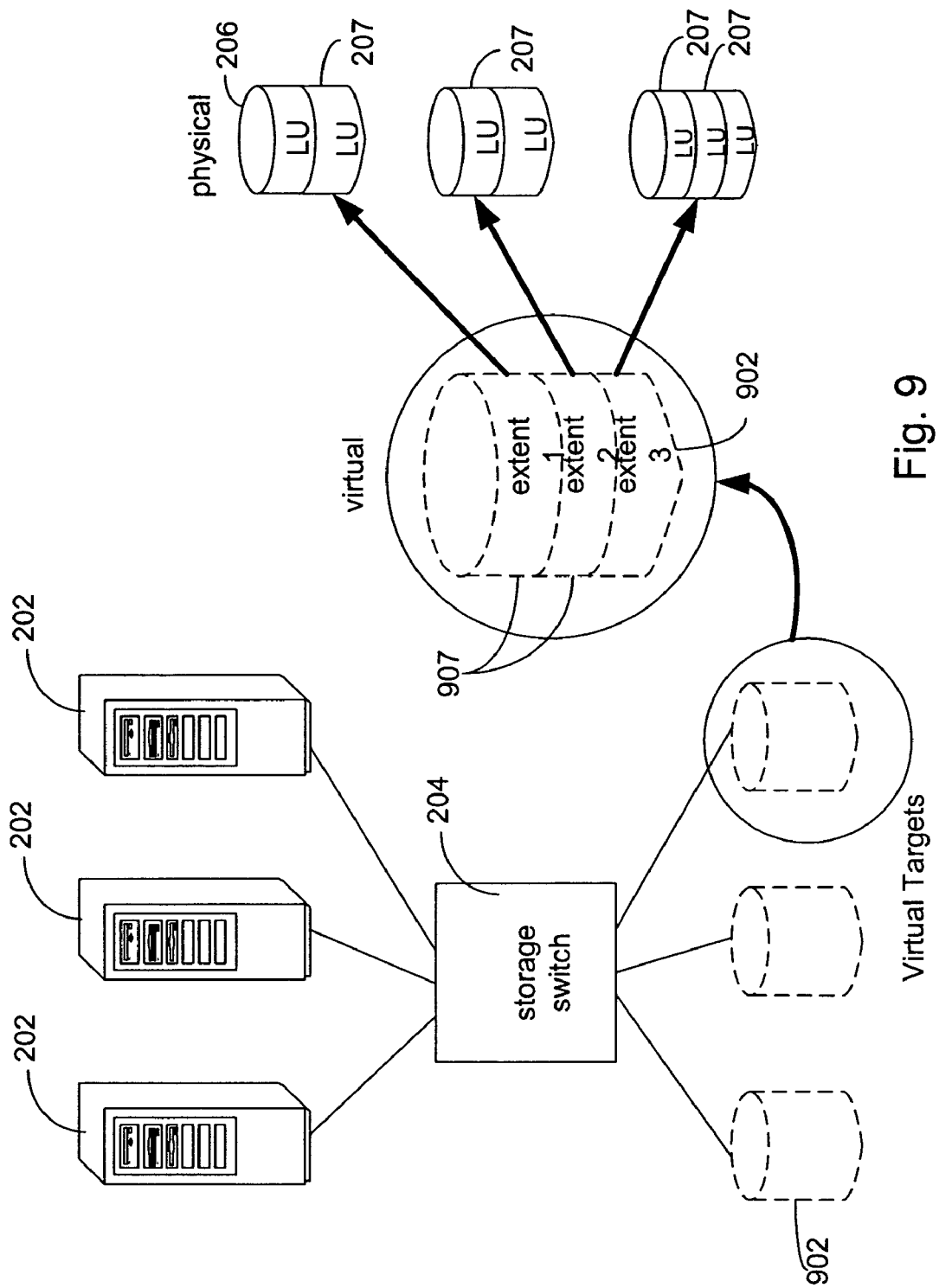
FIG. 9 is a generalized logic block diagram illustrating virtual targets as "seen" by a server.

Once the LUs for physical devices are in an accessible pool (i.e., not the "No Pool"), then a virtual target can be created from those LUs. Once created, as shown in FIG. 9, the servers (and their respective users) will "see" one or more virtual targets 902, each comprised of one or more extents 907, but they will not necessarily "see" the physical devices 206. An extent is a contiguous part of or a whole LU from a physical device. As shown in the example of FIG. 9, each extent in the example virtual target 902 is formed from entire LUs from several physical devices. "Extent" may still be referenced by an LUN from an initiator, such as a server, which doesn't realize a target is "virtual." The composition of the virtual targets, including protocols used by the LU is irrelevant to the server. However, as shown in FIG. 9, each virtual target is comprised of extents that map to the LUs of physical devices 206.

To provision a virtual target, a user will select several characteristics for the virtual target in one embodiment of the invention including:

the size (e.g., in Gigabytes);
a storage pool, although in one embodiment the user may select only from the storage pools which the user is permitted to access;
desired availability, e.g., always available (data is critical and must not ever go down), usually available, etc.;
the WWUI of the virtual target;
a backup pool;
user authentication data;
number of mirrored members;
locations of mirrored numbers (e.g., local or remote).

Still in other embodiments of the invention, different, additional, or fewer characteristics can also be selected.

The switch then analyzes the available resources from the selected pool to determine if the virtual target can be formed, and in particular the switch determines if a number of LUs (or parts of LUs) to meet the size requirement for the virtual target are available. If so, the virtual target is created with one or more extents and a virtual target object is formed in the SCC database identifying the virtual target, its extents, and its characteristics.

Examples of user-selected characteristics for four virtual targets are shown in Table 2 below:

TABLE 2

| | Virtual Target | | | |
|---|---|---|---|---|
| Virtual Target | A | B | C | D |
| size | 1 TB | 500 GB | 100 GB | 2 TB |
| storage pool | platinum | gold | bronze | bronze |
| availability | always | always | high | high |
| WWUI | drive A | drive B | drive C | drive D |
| backup pool | tape 1 | tape 2 | tape 3 | tape 4 |
| authentication data | connection ID and password | connection ID and password | password | password |
| # of mirrored members | 3 | 2 | 2 | 1 |
| locations of replicated sites | local | local | remote | none |
| Switching priority (One of 4) (if all else is equal, which target has priority) | 1 | 2 | 3 | 4 |
| Read Load Balance - on or off - when mirroring chosen | On | Off | Off | Off |
| Type of Media for backup (backup pool) | Fastest | Fast | Medium | Slowest |
| Mirroring - on or off | On | On | Off | Off |
| How many paths to storage from server (used for load balancing) | 2 | 2 | 1 | 1 |
| Path to storage via how many switches | 2 | 2 | 1 | 1 |
| Auto Migration to another target on excessive errors - on or off | Off | Off | On | Off |
| Physical storage - exclusive or shared | Exclusive | Exclusive | Exclusive | Shared |
| Virtual target - exclusive or shared | Exclusive | Exclusive | Shared | Shared |
| VPN on WAN connections | Yes | Yes | No | No |
| IP Precedence (DiffServ, RFC 2474) | Yes | Yes | No | No |
| MTBF | 15 yrs. | 10 yrs. | 5 yrs. | 5 yrs. |

In addition to provisioning a new virtual target, a switch in accordance with an embodiment of the invention can also modify existing virtual targets with new or different information or delete virtual targets when they are no longer needed.

Provisioning an Initiator Connection.

When a server or other initiator is connected to a switch and the initiator supports iSNS or SLP, in one embodiment the initiator will register itself with the switch, resulting in an initiator object stored in the SCC database. In other embodiments, however, the switch will include an access provisioning function which creates, updates, or deletes an initiator connection.

In creating the access connection—the connection between the switch and an initiator (such as a server)—a user will specify various parameters shown for one embodiment in Table 3:

TABLE 3

Initiator Connection the server WWUI
connection detail, such as protocol (e.g., GigE or Fiber Channel)
exclusive or shared
source and destination IP addresses
minimum and maximum percentage of bandwidth
# of connections required by the server
access security
read only or read/write
VPN enabled Some or all of the above information is saved in an initiator object stored in the SCC database. When the connection is removed, the initiator object will be deleted.

The switch, the management station, or other network management then creates a storage pool for the particular connection, specifying the LUs available to the initiator to form virtual targets.

User Domains

Like physical devices, virtual targets can be assigned to a pool accessible only to those with specified characteristics. Thus, like physical devices, virtual targets can be assigned to a user-specific domain (sometimes referred to herein as the User's Domain), a default domain (accessible to anyone), or a No Domain. Each domain will be identified, in one embodiment, by an object in the SCC database that includes a listing of all the virtual targets assigned to the domain. For virtual targets, the No Domain may include spare virtual targets, members of mirrored virtual targets, or remote virtual targets from another switch. Essentially, the virtual target No Domain is a parking place for certain types of virtual targets. For ease of description, when referring to virtual targets, pools will be referred to herein as "domains," but when referencing physical devices, pools will continue to be referred to as "pools." It is to be understood, however, that conceptually "pools" and "domains" are essentially the same thing.

Once an initiator connection is provisioned, as described above, a virtual target is provisioned that meets the initiator's requirements and placed into an accessible pool for the initiator or a previously provisioned virtual target is made accessible to the initiator, e.g., by moving the virtual target to the initiator's user domain from another domain such as the No Domain or Default Domain. (Note that either the virtual target or the initiator connection can be provisioned first—there is no requirement that they be provisioned in a particular order). Then, once an initiator requests access to the virtual target, e.g., by sending a read or write request, both the virtual target object and initiator object are read from the SCC database and information regarding the initiator connection and virtual target is passed to the relevant linecard(s) for use in processing the requests.

Figure 10B:
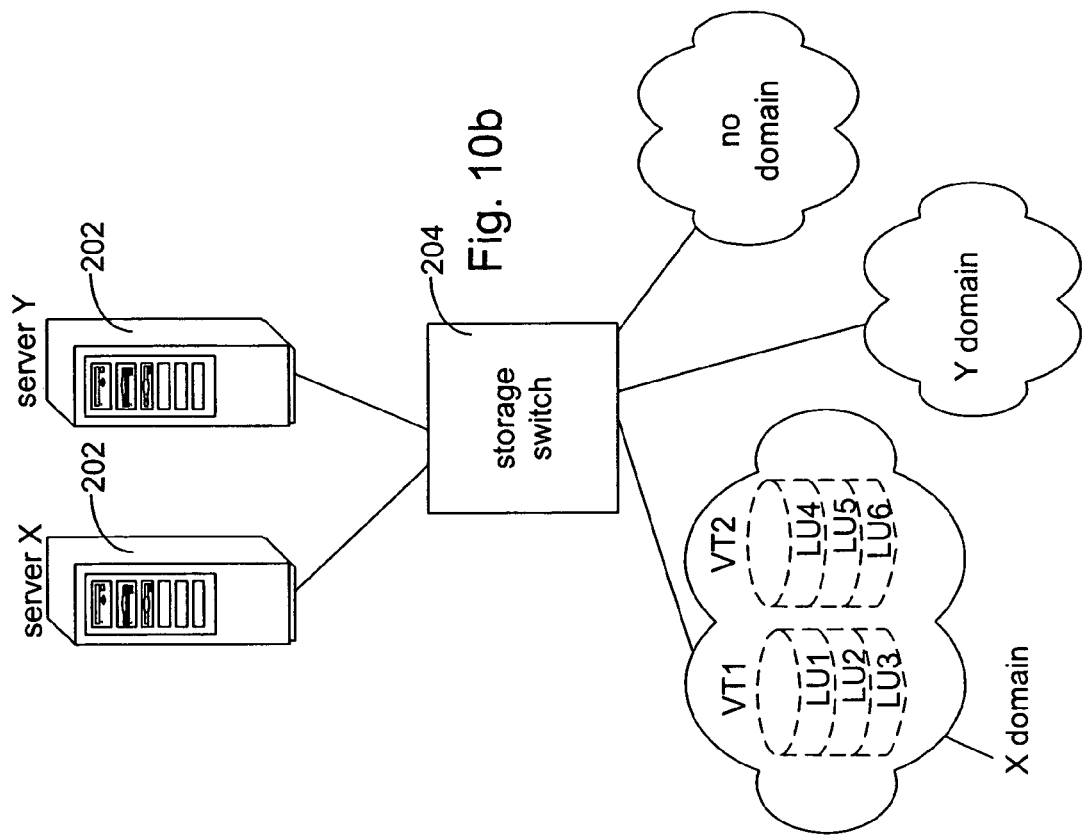
FIGS. 10b–10d are generalized block diagrams illustrating various exemplary virtual target storage pools.
Figure 10A:
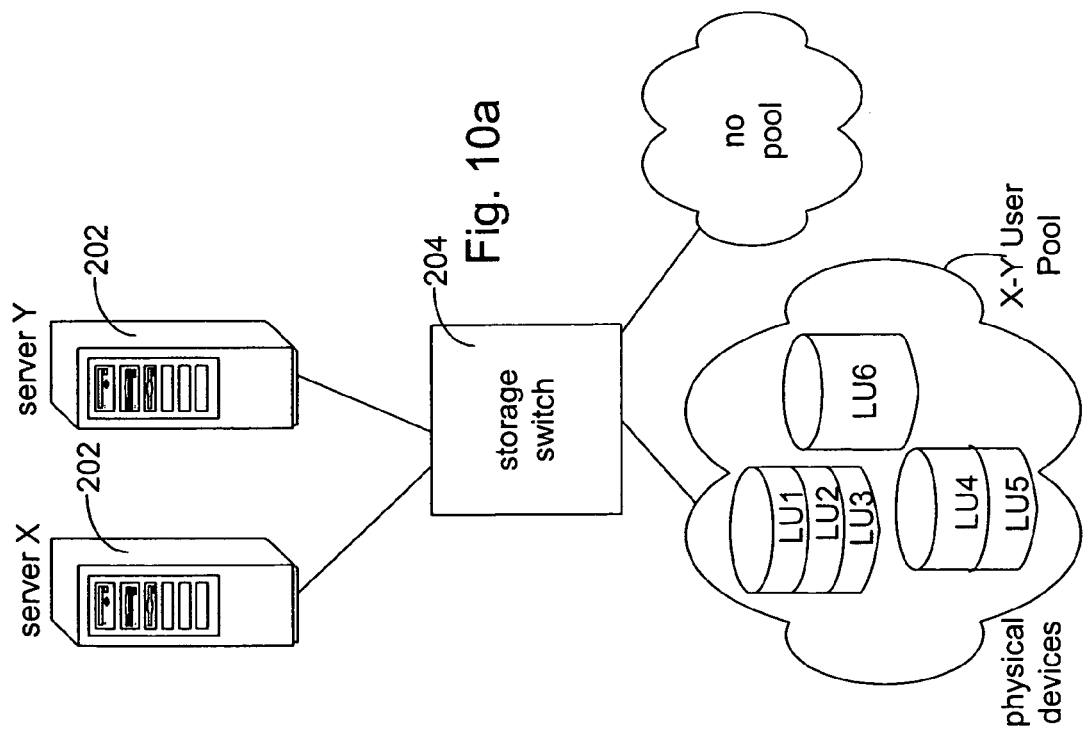
FIG. 10a is a generalized block diagram illustrating exemplary storage pools of physical devices.

Examples of provisioning virtual targets are given with reference to FIGS. 10a–d. Referring to FIG. 10a, assume there are physical devices having a total of 6 LUs—LU1, LU2, LU3, LU4, LU5, LU6—coupled to a switch and all are placed in a pool accessible to two initiators X and Y the "X-Y User Pool." If initiator X requires two virtual targets, then in one situation the LUs are provisioned to form virtual targets VT1 and VT2, where VT1 includes as extents LUs 1–3 and VT2 includes as extents LUs 4–6, where both VT1 and VT2 are placed in the server X user domain, thus allowing server X to access both virtual targets as shown in FIG. 10b. Server Y will not have access to either VT1 or VT2 since no virtual targets have been placed in the Y user domain. Alternatively, referring to FIG. 10c, if both server X and server Y require one virtual target, then VT1 and VT2 may be provisioned as before, but VT1 is placed in server X's user domain while VT2 is placed in server Y's user domain.

Figure 10D:
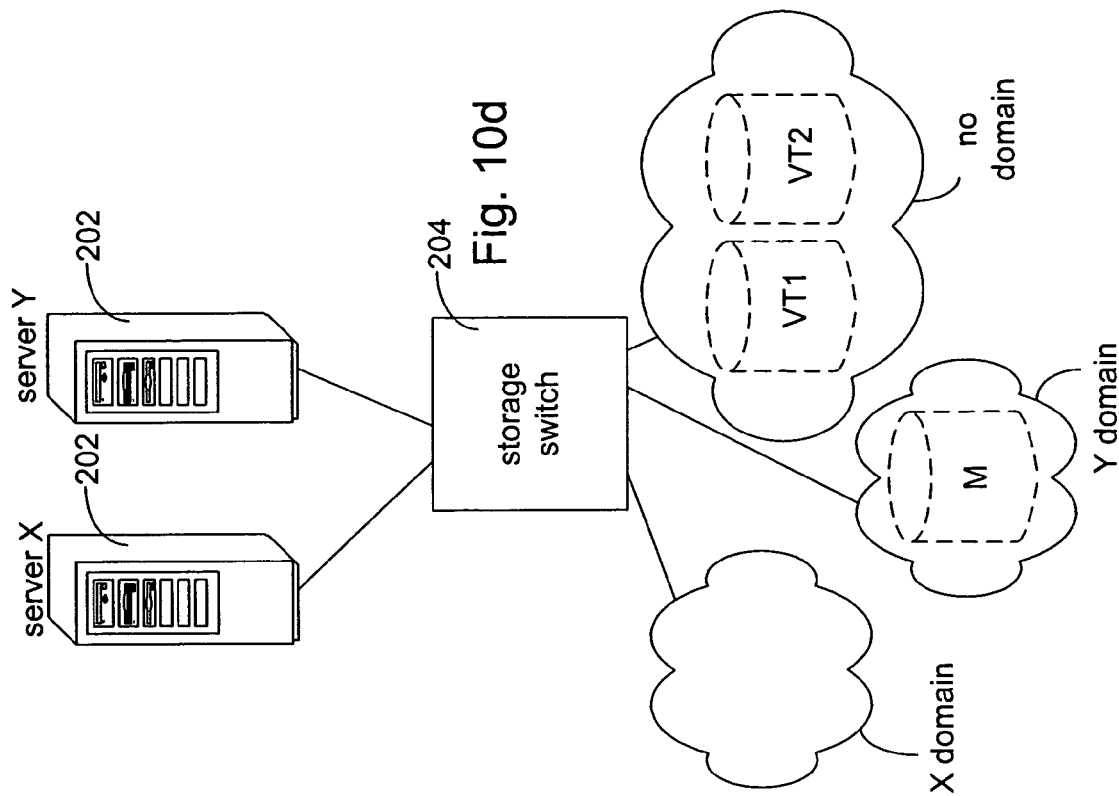
Figure 10C:
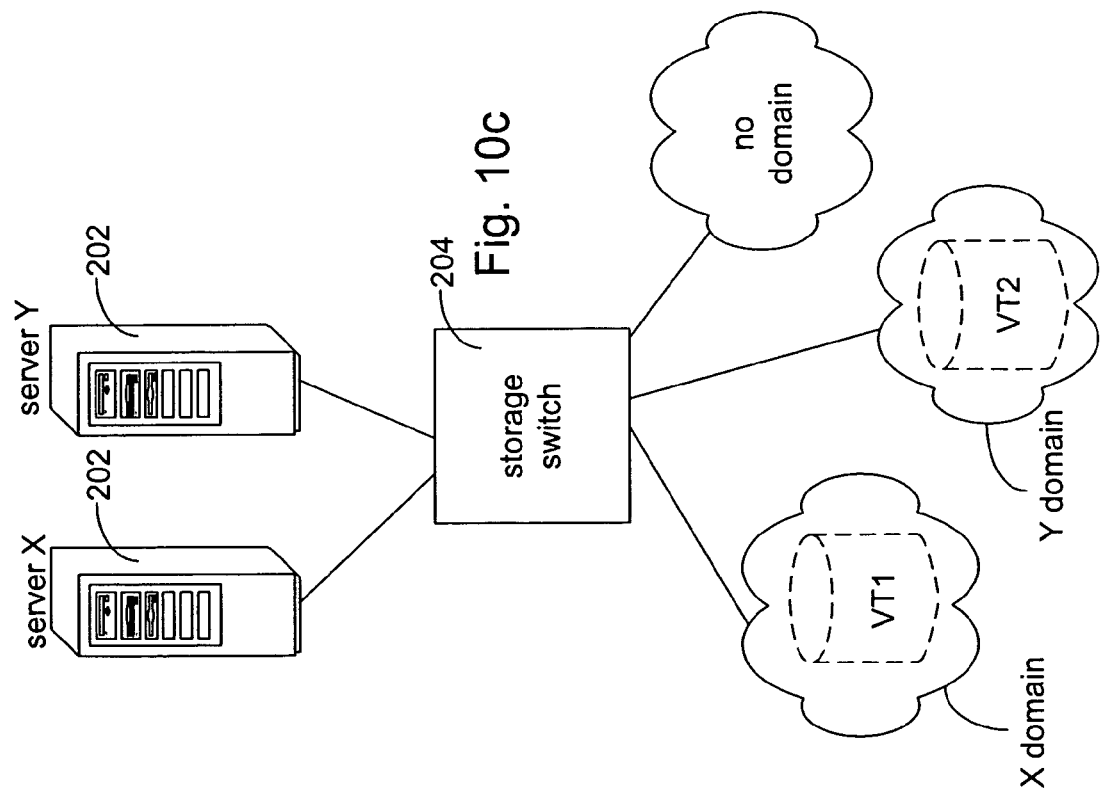

If instead Y requires a mirrored virtual target M, VT1 and VT2 will be created as members of the virtual target M. VT1 and VT2 will be placed in the switch's No Domain while M is made accessible to Y, as shown in FIG. 10d. As members of M, VT1 and VT2 are not independently accessible.

Figure 11:
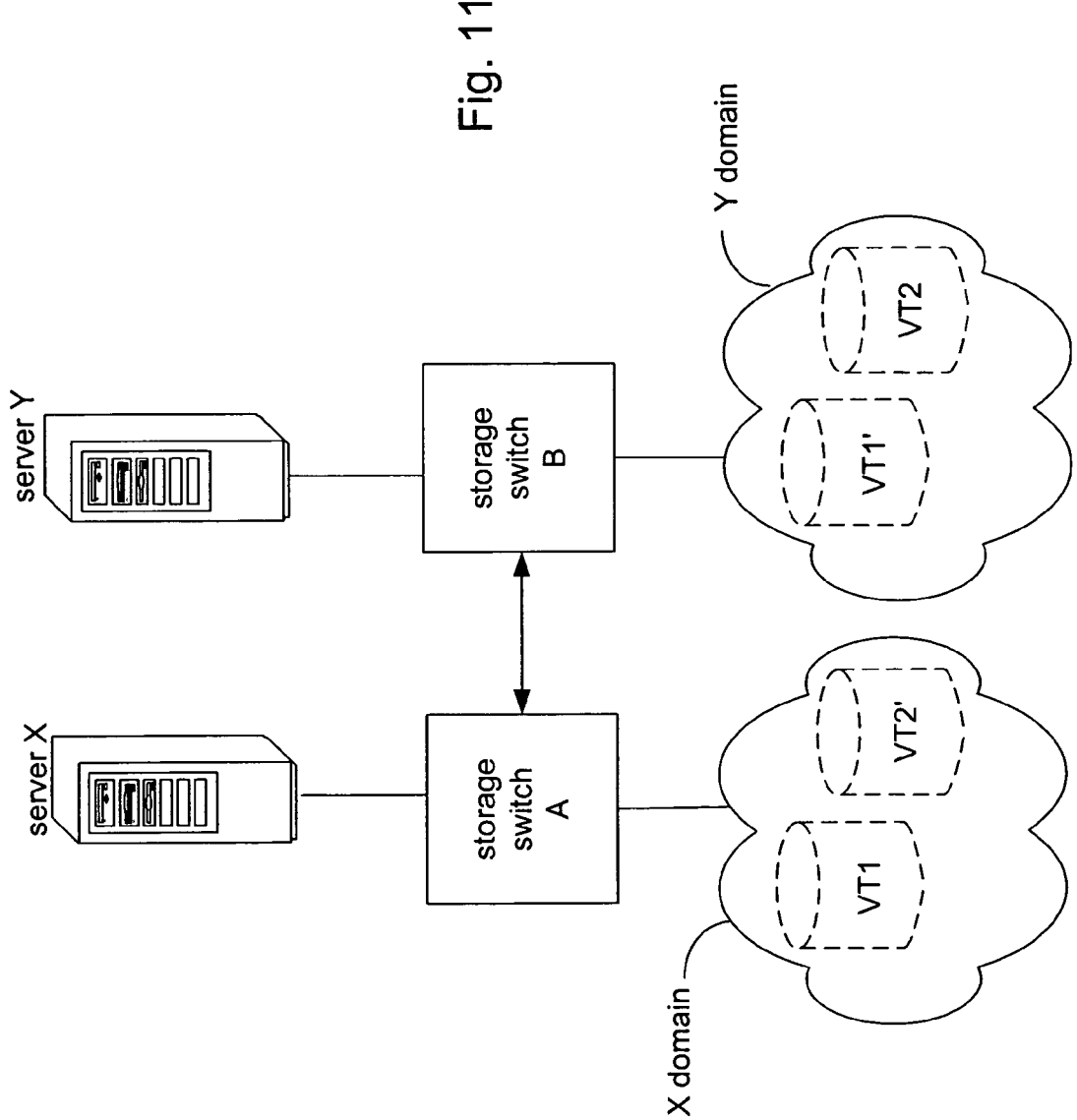
FIG. 11 is a generalized block diagram illustrating the accessibility from a first switch of a storage device coupled to a second switch.

In some embodiments of the invention, not only are devices and virtual targets coupled to one switch accessible to initiators, but virtual targets provisioned on another switch are accessible as well. Referring to FIG. 11, server X is coupled to switch A and server Y is coupled to switch B. VT1 is provisioned as part of server X's domain in switch A while VT2 is provisioned as part of server Y's domain in switch B. In addition, switch B is provisioned as an initiator to switch A, and switch A is provisioned as an initiator to switch B. In this manner, switch A can access VT2 via switch B, and switch B can access VT1 via switch A. Accordingly, VT1, referred to here as VT1' since access is via switch B, can be included in server Y's domain, and VT2, referred to here as VT2', can be included in server X's domain (note that although the LUs of physical devices can belong only to one pool at a time, virtual targets can belong to more than one domain at a time). When X accesses VT2, switch B sees switch A as an initiator. Similarly, when Y is accessing VT1, switch A sees switch B as an initiator. In one embodiment, an administrator will make selected resources of switch B available to other switches, e.g., switch A, and vice versa. Alternatively, in some embodiments, certain domains may be defined to allow access to their resources by multiple switches.

Defining SLA

In one embodiment of the invention, access to a virtual target by an initiator will be provided in accordance with an SLA selected by a user of which the QoS policy is only a part. An example of some parameters that may be selected for an SLA by a user in one embodiment are shown in Table 6 below:

TABLE 4

SLA Parameters

ID of initiator (identifies initiator object)
ID of virtual target (identifies virtual target object)
ID of User Domain
ID of extent getting provisioned TABLE 4-continued SLA Parameters Automatically increase size of virtual target - on or off
Automatically increase size at what threshold
Automatically increase what percentage of size
Numbers of local mirrors (may be restricted to possible range - see Table 2)
Local domain ID for each local mirrored member (may be restricted it to possible range - see Table 2)
Numbers of remote mirrors (may be restricted to possible range - see Table 2)
Remote domain ID (identified locally) for each remote mirrored member (may be restricted to Possible range - see Table 2)
Define Error Threshold in event auto migration is On (see Table 2)
Backup Enable (Disabled by default)
Backup Schedule
Pool ID for Backup LU When a user agrees to an SLA, the user also selects a quality of service (QoS) policy. As described above, in one embodiment, the QoS policy is generally defined by virtual target (as provisioned), the initiator connection (as provisioned), and the User Domain. Accordingly, referring again to Table 4, above, the first three entries in the table—"ID of Initiator," "ID of Virtual Target" and "ID of User Domain"—will inherently describe the QoS policy since the attributes of the initiator connection and virtual target were defined when these items were provisioned. For example, the minimum and maximum bandwidth for the initiator connection has already been identified (see Tables 2 and 3). The User Domain assists in defining the policy by determining, for example, if the initiator connection or virtual target connection is slower and forcing the QoS to the slower of the two. Of course, as mentioned above, the User Domain may not be necessary in all embodiments. As well, other embodiments may define an SLA using more, fewer, or different parameters than those shown in Table 4 above.

FIG. 12

Figure 12:
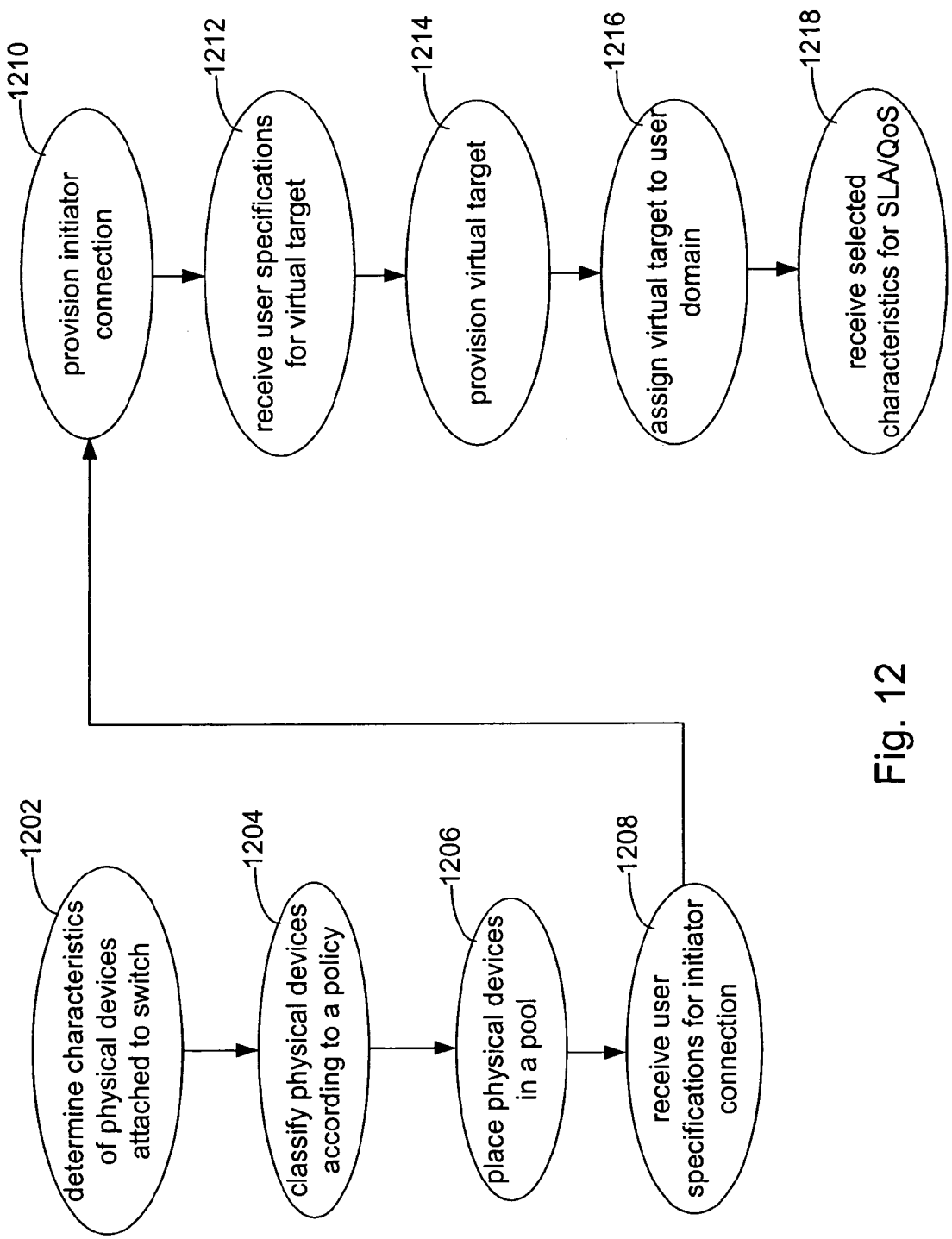
FIG. 12 is a flow diagram illustrating steps in accordance with an embodiment of the invention.

FIG. 12 summarizes the steps to provision the virtual targets and connections in order to be able to provide QoS in one embodiment. As shown, a switch in accordance with an embodiment of the invention discovers and determines the characteristics of physical devices in communication with the switch, step 1202. The switch then classifies those devices, step 1204, and associates those devices with a particular storage pool, step 1204. The switch will receive information for an initiator connection, step 1208, and will then provision the connection, step 1210, creating an object in the SCC database. The switch will also receive parameters for a virtual target, step 1212, and will provision the virtual target in accordance with those parameters, step 1214, if the resources are available, creating an object in the SCC database. Note that steps 1208–1214 can be performed in any order, the order shown in FIG. 12 being exemplary only. After the virtual target is provisioned, a user domain is created and the virtual target placed in the user domain or the virtual target is placed in a pre-existing user domain, step 1216. A user could also attempt to access a previously provisioned virtual target (hence, step 1214 may not be necessary for every connection). Finally, a switch in accordance with an embodiment of the invention receives SLA/QoS parameters, step 1218.

Objects

As discussed above, each virtual target, each initiator connection, and each physical device is identified in the SCC database with information included in an object for the respective entity. Each virtual target object and physical target object will include a listing of extents or LUs that comprise it. An example of a Virtual Target object, in one embodiment of the invention, includes the following information:

entity type
    entity identifier
    managing IP address
    time stamp and flags
    ports
    domain information
    SCN bit map
    capacity and inquiry information
    number of extents
    list of extents
    extent locator
    virtual mode pages
    quality of service policy (e.g., the first three entries of Table 4)
    statistics—usage, error, and performance data
    SLA identifier A physical target (or LU) object may include similar information.

In the object, "entity type" will identify whether the entity is a virtual target or physical target. "Entity identifier" is, in one embodiment, a WWUI, which may be created by the user in some embodiments. The "managing IP address" indicates the address of the device through which the entity is configured, e.g., a management station. For instance, a virtual target is configured through a management station, which is accessed through the SCC in one embodiment of the invention.

"Time stamp and flags" are used to track events such as when the virtual target or other entity was created or changed. Flags may be used to indicate various services or events in progress, such as copying of the data in a virtual target. "Ports" include a list of the ports through which the LU can be accessed and include information regarding the port names and linecard number, TCP/IP address or Fiber Channel 24-bit address, and whether the port is a primary or secondary port for the entity.

"Domain information" includes the storage domain or pool to which the virtual target or entity belongs. "SCN bit map" indicates system change notification for the virtual target. "Capacity and inquiry information" indicates how big the virtual or physical target is as well as the inquiry information usually provided by a device vendor. For instance, inquiry information for a physical device will often identify its manufacturer whereas inquiry information for a virtual target will often identify the switch that created the virtual target.

Each LU of a physical device is comprised of one or more contiguous pieces of storage space called an extent, which are used to form the virtual targets. Accordingly, "number of extents" identifies how many extents form the virtual target. "List of extents" identifies each of the extents, in one embodiment, by an offset and a size. For example, a 10 GB virtual target comprised of three extents may identify the extents in the "list of extents" as shown in Table 5:

TABLE 5

| extent | offset (virtual target) | size |
|---|---|---|
| 1 | 0 | 2GB |
| 2 | 2GB | 5GB |
| 3 | 7GB | 3GB |

"Extent locator" identifies exactly where the extents are located, i.e., on which physical devices. For example, the above 10 GB, 3-extent virtual target may have the following extent locator:

TABLE 6

| extent | storage device | offset (physical device) |
|---|---|---|
| 1 | 2 | 5GB |
| 2 | 1 | 3GB |
| 3 | 3 | 15GB |

In this example using both Table 5 and Table 6, it can be determined that the first extent of the virtual target is mapped to physical storage device 2 (Table 6) starting at an offset of 5 GB (Table 5) and extending for 2 GB (Table 5). The second extent (Table 5) is mapped to physical storage device 1 (Table 6) starting at an offset 3 GB (Table 6) and extending for 5 GB (Table 5). And finally, the third extent is mapped to physical storage device 3 (Table 5) starting at an offset 15 GB (Table 6) and extending for 3 GB (Table 5).

If the virtual target is mirrored, as it may be in some embodiments, every member of the mirrored virtual target will have an identical extent list, although the extent locators will be different.

"Virtual mode pages" identify the mode pages frequently found in SCSI commands as will be understood in the art. This information includes the block transfer size, immediate data support, or any unique information that application software with SCSI-mode-page commands can set and retrieve.

"Quality of service policy" determines the service attributes for the virtual target and is selected at the time of provisioning of the virtual target. In one embodiment, Quality of Service policy will be defined using the identifiers found in the first three entries of Table 4.

"Statistics" are collected at run time of the virtual target by the switch in one embodiment of the invention. They may include usage, error, and performance data in one embodiment of the invention, and are further discussed below.

The "SLA identifier" identifies an SLA object for information regarding the SLA.

Statistics

A switch in accordance with an embodiment of the invention also collects statistics. In one embodiment, for each connection from one initiator to one virtual target, the following information is collected by the SPU of the linecard connecting to the initiator:

1. Total read access (number of read requests);
2. Accumulated read transfer bytes (total number of bytes read from storage);
3. Accumulated read response time (time from receiving request to getting a response);
4. Total write access (number of write requests);
5. Accumulated write transfer bytes;
6. Accumulated write response time;
7. Accumulated recoverable errors;
8. Accumulated unrecoverable errors.

The CPU on each linecard periodically requests the statistics from the SPU. The SPU responds by returning the data. The SPU then resets the data to zero and resumes collection.

Based on the collected data, the CPU maintains the following statistics:

1. Average read access rate;
2. Maximum read access rate;

3. Average read transfer rate;
4. Maximum read transfer rate;
5. Minimum read response time;
6. Average read response time;
7. Maximum read response time;
8. Average write access rate;
9. Maximum write access rate;
10. Average write transfer rate;
11. Maximum write transfer rate;
12. Minimum write response time;
13. Average write response time;
14. Maximum write response time;
15. Recoverable errors per billion of requests;
16. Unrecoverable errors per billion of requests.

After some pre-selected time period in one embodiment, the CPU forwards the statistics to the SCC and updates the relevant VTDs (stored in the SPUs). In another embodiment, the SCC will request the statistics from the CPU, and the CPU will provide them to the SCC. In some embodiments, the SCC will also reset its statistics periodically, e.g., weekly, to ensure that data is accurate and not over-accumulated.

Enforcing OoS

The minimum percentage of the initiator connection bandwidth is guaranteed by the QoS in one embodiment. Hence, in such an embodiment when multiple initiators are provisioned on a single port, the sum of all minimum bandwidths of all initiators must be less than or equal to 100%. In contrast, the maximum percentage provides the allowable use of the connection when there are no other contending users on the same connection. Thus, the sum of maximum percentages of bandwidths of all initiators can exceed 100% of the bandwidth of the connection. When they do, the defined switching priority (see Table 2) determines which initiator gets scheduled first.

In a conventional communications network (as opposed to a storage network), QoS is used to ensure that users get the percentage of data bandwidth of a connection that they paid for. It allows time-sensitive data such as audio and video to experience only acceptable interruptions by either negotiating a reserved data bandwidth before transmission or giving the time- sensitive transmission a higher priority in a congested situation. The QoS is enforced by prioritizing the switching traffic even at the expense of dropping packets.

However, dropping a request in a storage system is unacceptable, unlike conventional network communication system, where a request may include one or more packets. In one embodiment, a request includes all packets sent back and forth from initiator to target until the request is complete, e.g., an iSCSI command PDU, an iSCSI R2T, an iSCSI write data PDU, and an iSCSI response PDU will form a single request. For a storage switch in accordance with an embodiment of the invention, the data bandwidth, in one embodiment, is calculated by the number of requests per second multiplying by the average transfer size of the request. For example, if the average transfer size is 8 KB, with 1000 requests per second, the bandwidth for the storage device will be 8 MB/sec (or 80 Mb/sec). But since a switch has no control of the average transfer size of the request, enforcing the QoS for storage access is to control the number of concurrently allowed requests per second. Thus, if too many requests are sent from an initiator, the number of concurrent requests must be reduced. In one embodiment, in a worst case only one request can be sent by an initiator at a time.

A virtual target supports a maximum number of concurrent requests. An initiator accessing multiple virtual targets can have a maximum number of requests sent that is equal to the sum of the maximum number of requests for all of the virtual targets it is accessing. But, when multiple initiators share one or more virtual targets, the maximum number of requests available are shared among the initiators, being prorated according to the respective QoS parameters of minimum percentage of bandwidth. For instance, if two initiators share access to a virtual target that can accomodate 100 concurrent requests, and initiator 1 gets a minimum of 70% of the bandwidth while initiator 2 gets a minimum of 30% of the bandwidth, then initially initiator 1 can send 70 requests and initiator 2 can send 30 requests. Nonetheless, because each initiator will have its own request size, a large request size may consume greater bandwidth and crowd out other initiators of smaller transfer sizes. Thus, adjustment of allowable requests by each initiator in order to guarantee a bandwidth range is performed in one embodiment as follows.

The traffic managers (TMs) 608 (FIG. 6) in both ingress and egress linecards monitor the transfer bandwidth of different connections. The TM also schedules delivery based on QoS parameters. Thus, the TM guarantees that each shared connection gets its minimum bandwidth and is limited by its maximum bandwidth—in other words, the TM assures that each connection is within a specified range. To do so, in one embodiment, as packets accumulate inside the TM buffer 612, such accumulation will indicate that an initiator has exceeded its limitations. The TM will send a control message to the SPU indicating that the offending initiator should slow its connection. After receiving such a message, the SPU will reduce the number of allowable requests to the offending initiator while the number of allowable requests to the initiator that was receiving a smaller share would be increased. In one embodiment, notification of the number of requests available to a server may occur in the MaxCmdSN field of an iSCSI PDU For example, an initiator A and an initiator B both have as their minimum bandwidth 50% of a shared initiator connection. Using a transfer size of 100 KB, initiator A sends 800 requests per second thus getting 80 MB per second of bandwidth on the connection. Using a transfer size of 4K, initiator B sends 2000 requests per second, but gets only 8 MB per second of bandwidth. Thus, if the maximum bandwidth allowed for initiator A is 70 MB per second, the switch must reduce the number of requests from initiator A to reduce its requests to 700 per second to obtain 70 MB per second. Accordingly, the ingress traffic manager $608_i$ will report to the ingress SPU that initiator A has exceeded its maximum and packets are accumulating in the buffer $612_i$. The SPU, in receiving the message, will reduce the number of allowable requests to A and increase those to B. Thus, initiator B will be able to send more requests on the connection. It should be noted that when the initiator is not maximizing the use of its allowable requests to even reach its minimum percentage bandwidth, no adjustment will be necessary. Further, because initiator B is not currently demanding 50% of the connection, initiator A is free to use up to (but not to exceed) its maximum allowed bandwidth.

Similarly, if two initiators on two different connections are sharing a single virtual target, the prorated request numbers for each initiator are adjusted when the TM $608_e$ on the egress linecard detects unfair bandwidth uses between the two initiators. It will detect such unfair bandwidth usage when the offending initiator has packets accumulated in the buffer $612_e$.

When the connection is not shared and becomes congested due to the physical storage device itself being busy, the egress TM $608_e$ will inform the PPU because packets are accumulating in the buffer $612_e$. Again, the SPU will then reduce the number of allowable requests to slow down the initiator(s).

The switch will also match the bandwidth between the initiator and the storage device. For example, to support an initiator having a minimum of 100% of a 1 Gb connection, no other virtual target can be allocated on the storage connection. But when an initiator only requires 50% bandwidth of the connection, the remaining 50% can be allocated to another virtual target.

Finally, when everything else is equal, the priority of a connection determines which command gets delivered first by the switch traffic manager of a linecard.

Table 7 below summarizes the QoS enforcement discussed herein for one embodiment.

TABLE 7

| initiator ingress port | target egress port | detection | actions |
| --- | --- | --- | --- |
| not shared | not shared | egress buffer threshold | reducing allowable requests |
| shared | not shared | ingress buffer threshold | reducing allowable requests from offending initiators |
| not shared | shared (shared target) | egress buffer threshold | redistribute allowable requests to different initiators |
| not shared | shared port (different targets) | egress buffer threshold | reducing allowable requests to offending initiator |
| shared | shared | ingress and egress buffer threshold | treat each virtual target separately as the above four cases |

For the first situation, where an initiator ingress port is not shared and the target egress port is not shared, congestion will often be caused by busy physical target devices and will generally be detected when an egress buffer threshold is exceeded (the egress buffer will be backed up beyond an acceptable point). Thus, appropriate action is to reduce the allowable number of requests from the initiator.

In the second situation, the shared initiator ingress port is shared by initiators that are accessing different targets on different ports, so that the target egress port is not shared. Excessive bandwidth use by one of the initiators is detected in the ingress buffer by determining if a threshold has been exceeded, causing the buffer to back up beyond an acceptable point. Appropriate action is to reduce the allowable number of requests from the offending initiator.

In the third situation, the initiator ingress port is not shared but the target egress port is shared, indicating that the same target is accessed by different initiators from different ports. Excessive bandwidth usage caused by an excessive number of requests by one of the initiators will be detected in the egress buffer. Appropriate action is to redistribute the number of allowable requests from the different initiators, e.g., decrease the number of requests allowed one initiator while increasing the number of requests to the other initiator.

In the fourth situation, the initiator ingress port is not shared but the target egress port is shared, but in this instance different targets are accessed on the same egress port by different initiators. In such a circumstance, excessive bandwidth is detected in the egress buffer where each target is given a percentage of the connecting bandwidth. Appropriate action to take in such circumstances is to reduce the number of allowable requests to the offending initiator.

Finally, the fifth situation indicates a shared initiator ingress port and a shared target egress port. In such a situation, there is a two-tiered decision: first to ensure that each virtual target is getting its allocated percentage of bandwidth, and then second, to prorate the allowable number of requests to different initiators. Such decision making takes place in both ingress and egress buffers by looking to see if the buffer thresholds have been exceeded. Appropriate action is to treat each virtual target separately as is done in the above four circumstances and to reduce the number of requests as required.

As should be understood, Table 7 is illustrative only. In other embodiments, other actions could occur to enforce QoS and other situations could occur that are not described above.

Load Balancing

Load balancing is utilized in one embodiment and occurs by selecting a path dynamically to reach a target device faster when more than one path is available to the target device. Load balancing is done dynamically (as opposed to statically, at fixed time intervals) on every port in the switch and for each request by utilizing the SPU processing power on each port.

Failover is a special case of load balancing and utilized in some embodiments of the invention. Failover will occur when one member of a mirrored target becomes unavailable or one path becomes unusable to a target that is accessible by multiple paths—in either case, the other member is accessed or the other path is utilized.

Figure 13B:
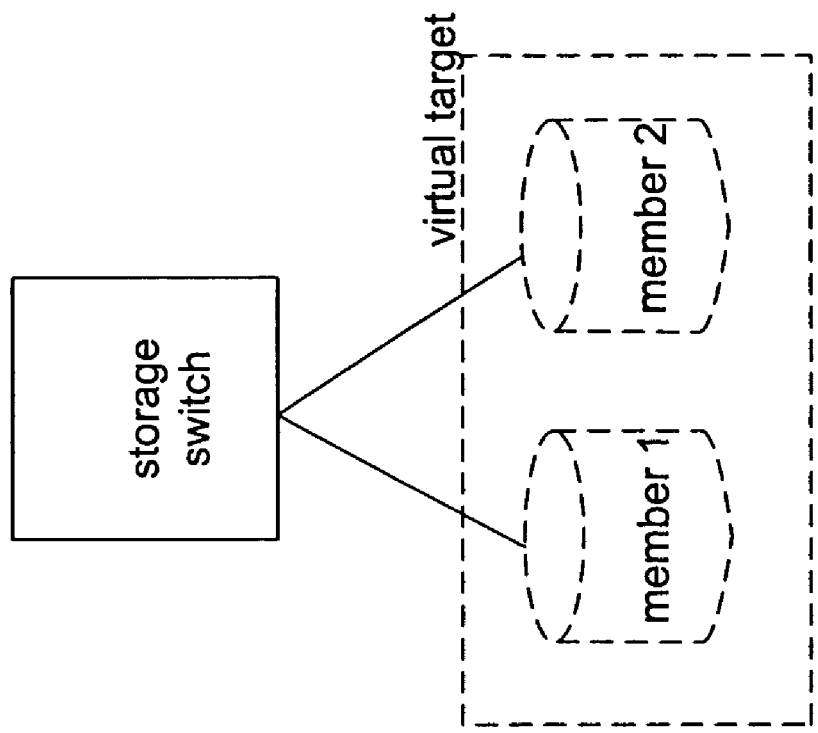
FIGS. 13a–13b illustrate, with generalized block diagrams, load balancing.
Figure 13A:
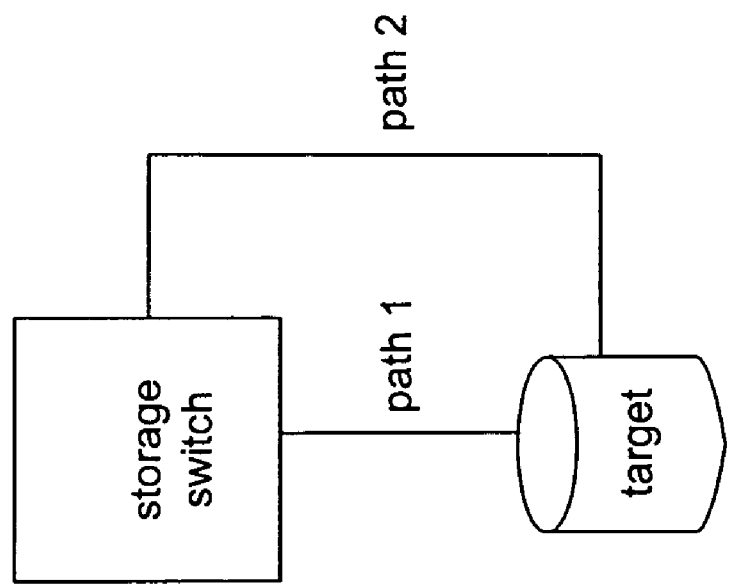

In a switch in accordance with an embodiment of the invention, the switch performs two different types of actions related to load balancing:

1. Referring to FIG. 13b, if the virtual target is mirrored, the switch will steer initiator read requests to one of the mirrored members by selecting the member of the mirrored virtual target with the shortest average response time; and
2. Referring to FIG. 13a, if there is more than one path to an LU, the switch will steer requests to the LU on the path with the shortest average response time. However, in one embodiment, this load balance action is only performed when the multiple paths are connected from the target LU to the same SPU, although other embodiments may not have such a requirement.

In some embodiments, a switch will also support a "pass-thru" configuration. In such an embodiment, the virtual target is the physical target itself, and all commands "pass-thru" the switch without interpretation—e.g., without virtualization or translation. In such embodiments, all load balance functions are handled by the server itself.

More specifically, for load balancing, using the statistics collected as discussed above, a switch in accordance with the invention tracks the average response time of each target, including the response time of each of the members of a mirrored virtual target. The relevant statistics are stored in each VTD, which is periodically updated by the CPU. On a read operation, the SPU (referring to the VTD) then selects the path with the shortest average response time and forwards the request on that path or it selects the mirrored member with the shortest average response time and forwards the request to that member. Note that with mirrored targets, a selection amongst mirrored members would not be performed for write operations since writes will be made to all members of a mirrored virtual target. When there is no clear advantage of one path over the other, or one mirrored member over the other, the commands are sent to the various paths/members alternately.

In one embodiment of the invention, multiple concurrent connections will only be used for iSCSI devices, as Fibre Channel does not currently support such multiple concurrent connections. However, other embodiments using other protocols may also support multiple concurrent connections.

It should be understood that the particular embodiments described above are only illustrative of the principles of the present invention, and various modifications could be made by those skilled in the art without departing from the scope and spirit of the invention. Thus, the scope of the present invention is limited only by the claims that follow.

What is claimed is:

1. A method for use in a storage area network, the method comprising:
   provisioning, by a first storage switch, a first virtual target using storage resources in communication with the first storage switch;
   provisioning, by a second switch, a second virtual target using storage resources in communication with the second switch;
   associating the first virtual target with a user domain accessible by an initiator in communication with the first switch;
   associating the second virtual target with the user domain so that the second virtual target is also accessible by the initiator, including provisioning an initiator connection from the first switch to the second switch.

2. A storage area network, comprising:
   a first storage switch, having one or more physical devices in communication with it and one or more initiators in communication with it, wherein each physical device includes one or more logical units (LUs);
   a second switch, having one or more physical devices in communication with it and one or more initiators in communication with it, wherein each physical device includes one or more LUs;
   the first switch including a description of a first virtual target, the first virtual target formed using the LUs of one or more physical devices in communication with the first switch;
   the second switch including a description of a second virtual target, the second virtual target formed using the LUs of one or more physical devices in communication with the second switch;
   the first switch including a description of a user domain, wherein the user domain includes both the first virtual target and the second virtual target;
   the second switch including a description of an initiator connection from the first switch to the second switch.

* * * * *